US009973769B2

(12) United States Patent
Forehand et al.

(10) Patent No.: US 9,973,769 B2
(45) Date of Patent: May 15, 2018

(54) METHODS AND APPARATUS OF ENCODING REAL TIME MEDIA CONTENT

(71) Applicant: Time Warner Cable Enterprises LLC, New York, NY (US)

(72) Inventors: Joseph Forehand, Lone Tree, CO (US); Niem Dang, Sterling, VA (US); John Patti, Lakewood, CO (US); Kenneth Gould, Reston, VA (US)

(73) Assignee: Time Warner Cable Enterprises LLC, St. Louis, MO (US)

(*) Notice: Subject to any disclaimer, the term of this patent is extended or adjusted under 35 U.S.C. 154(b) by 143 days.

(21) Appl. No.: 14/825,061

(22) Filed: Aug. 12, 2015

(65) Prior Publication Data

US 2017/0048536 A1   Feb. 16, 2017

(51) Int. Cl.
| | |
|---|---|
| *H04N 19/436* | (2014.01) |
| *H04N 19/39* | (2014.01) |
| *H04N 21/2343* | (2011.01) |
| *H04N 21/24* | (2011.01) |
| *H04N 21/845* | (2011.01) |
| *H04N 21/854* | (2011.01) |
| *H04N 19/65* | (2014.01) |

(52) U.S. Cl.
CPC .......... *H04N 19/436* (2014.11); *H04N 19/39* (2014.11); *H04N 21/23439* (2013.01); *H04N 21/2404* (2013.01); *H04N 21/8456* (2013.01); *H04N 21/85406* (2013.01); *H04N 19/65* (2014.11)

(58) Field of Classification Search
CPC .. H04N 19/436; H04N 19/39; H04N 21/2343; H04N 19/65

USPC .................................................... 375/240.26
See application file for complete search history.

(56) References Cited

U.S. PATENT DOCUMENTS

| | | | |
|---|---|---|---|
| 2007/0124474 A1* | 5/2007 | Margulis ................... G06F 3/14 | 709/226 |
| 2010/0091888 A1* | 4/2010 | Nemiroff ......... H04N 21/23655 | 375/240.28 |
| 2012/0128061 A1* | 5/2012 | Labrozzi ........ H04N 21/234354 | 375/240.02 |
| 2014/0047040 A1* | 2/2014 | Patiejunas ............... H04L 51/24 | 709/206 |
| 2015/0003517 A1* | 1/2015 | Misumi .............. H04N 21/2383 | 375/240.02 |

(Continued)

*Primary Examiner* — Zhihan Zhou
(74) *Attorney, Agent, or Firm* — Straub & Straub; Michael P. Straub; Stephen T. Straub

(57) ABSTRACT

Methods, apparatus and systems of parallel encoding and publishing media content in a plurality of encoded formats. One exemplary embodiment includes the steps of receiving at least a first portion of a first content stream; communicating the first portion of the stream to a plurality of encoders including a first through Nth encoder, operating said first through Nth encoders in parallel to perform different encoding operations in real time to generate first through Nth encoded versions of said first portion of content; monitoring the encoding status of each of the first through Nth encoders; determining when at least the first through Nth encoders are done processing the first portion of the stream, and publishing, in response to determining that the first through Nth encoders are done processing the first portion of the stream, at the same time, the successfully encoded versions of the first portion of the stream.

19 Claims, 11 Drawing Sheets

(56) References Cited

U.S. PATENT DOCUMENTS

2015/0131969 A1* 5/2015 Taraki ................ H04N 5/76
386/248
2016/0036719 A1* 2/2016 Alicherry ............ H04L 67/2828
714/15

* cited by examiner

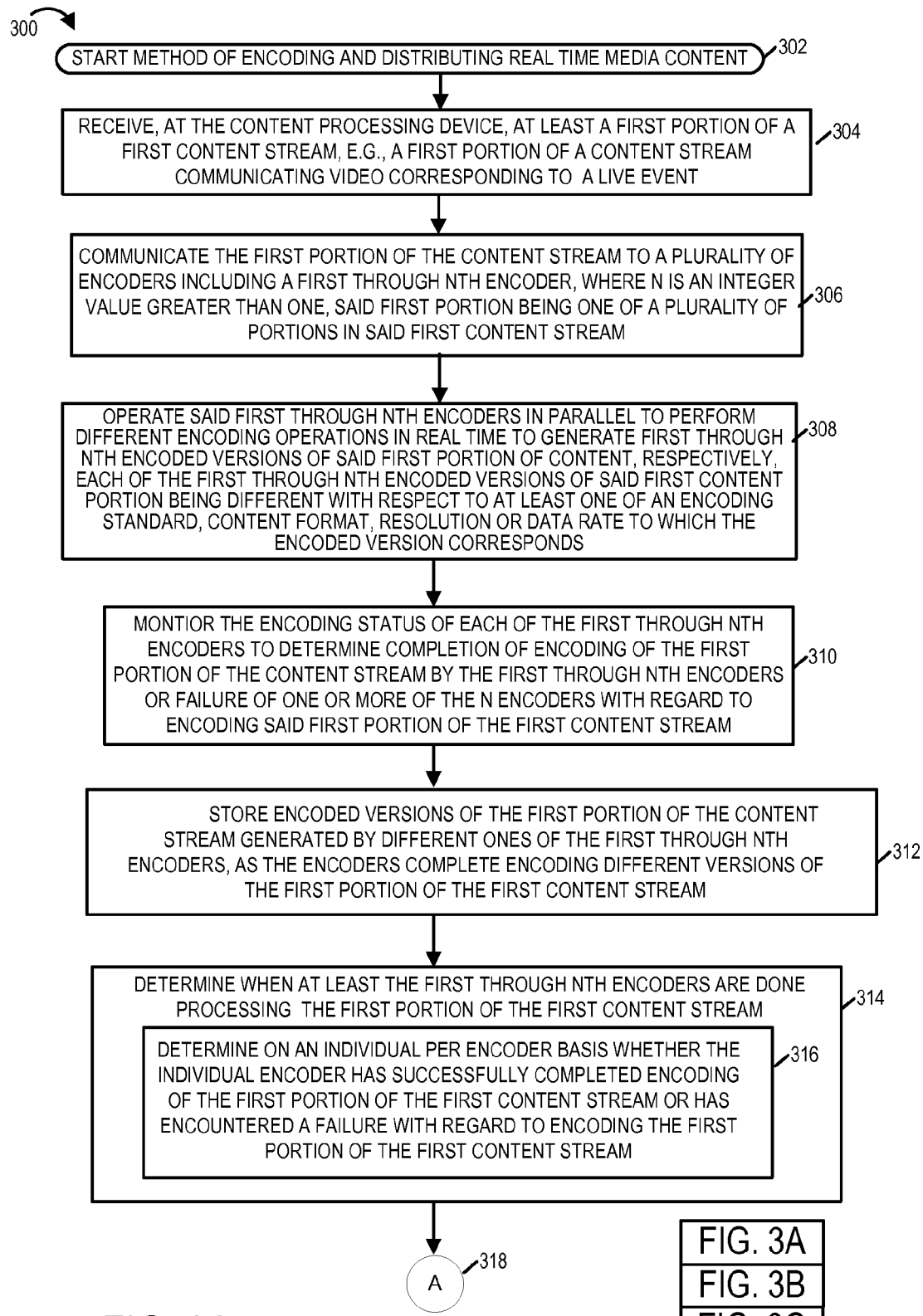

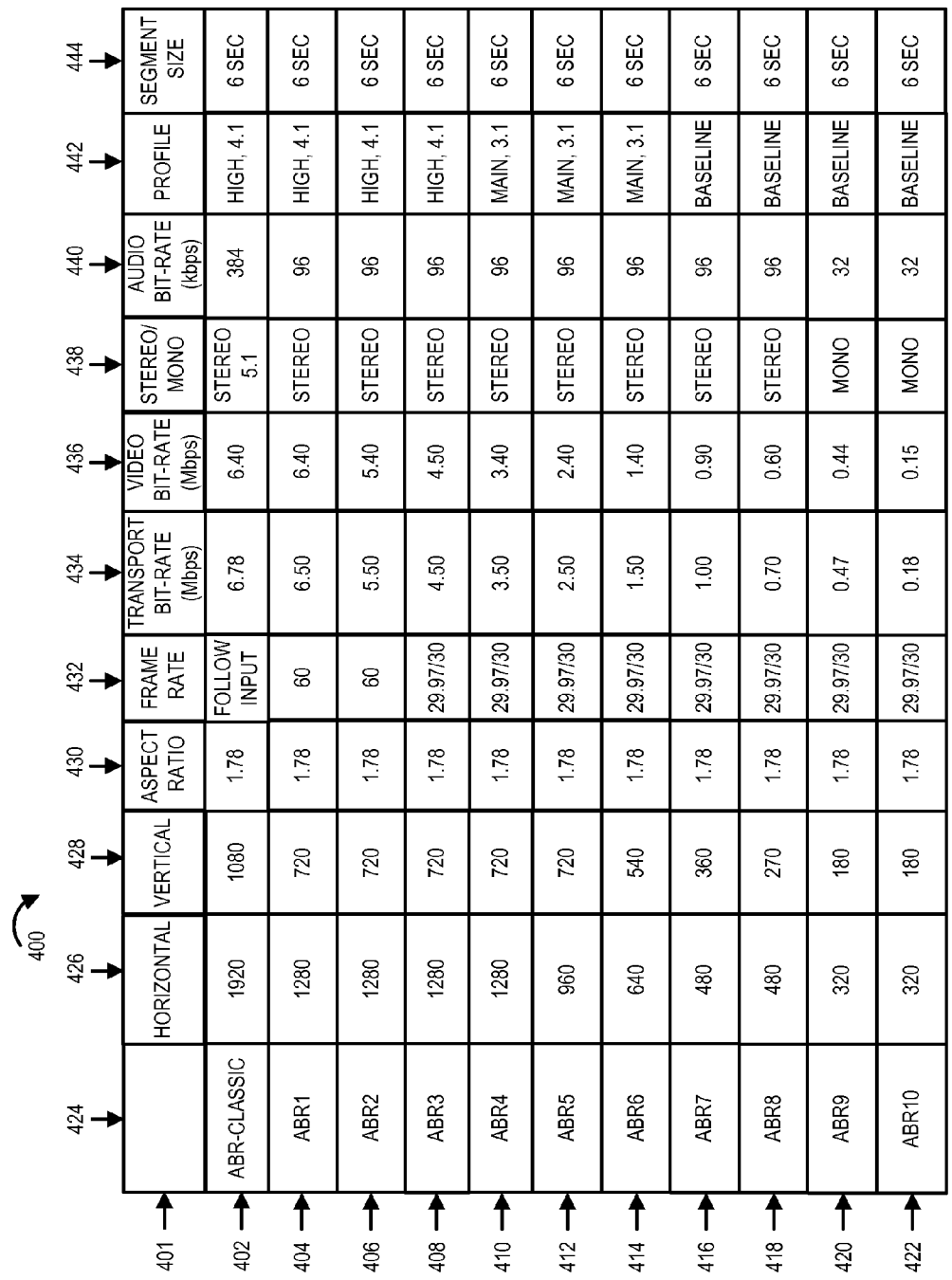

| | HORIZONTAL 426 | VERTICAL 428 | ASPECT RATIO 430 | FRAME RATE 432 | TRANSPORT BIT-RATE (Mbps) 434 | VIDEO BIT-RATE (Mbps) 436 | STEREO/ MONO 438 | AUDIO BIT-RATE (kbps) 440 | PROFILE 442 | SEGMENT SIZE 444 |
|---|---|---|---|---|---|---|---|---|---|---|
| ABR-CLASSIC 402 | 1920 | 1080 | 1.78 | FOLLOW INPUT | 6.78 | 6.40 | STEREO 5.1 | 384 | HIGH, 4.1 | 6 SEC |
| ABR1 404 | 1280 | 720 | 1.78 | 60 | 6.50 | 6.40 | STEREO | 96 | HIGH, 4.1 | 6 SEC |
| ABR2 406 | 1280 | 720 | 1.78 | 60 | 5.50 | 5.40 | STEREO | 96 | HIGH, 4.1 | 6 SEC |
| ABR3 408 | 1280 | 720 | 1.78 | 29.97/30 | 4.50 | 4.50 | STEREO | 96 | HIGH, 4.1 | 6 SEC |
| ABR4 410 | 1280 | 720 | 1.78 | 29.97/30 | 3.50 | 3.40 | STEREO | 96 | MAIN, 3.1 | 6 SEC |
| ABR5 412 | 960 | 540 | 1.78 | 29.97/30 | 2.50 | 2.40 | STEREO | 96 | MAIN, 3.1 | 6 SEC |
| ABR6 414 | 640 | 360 | 1.78 | 29.97/30 | 1.50 | 1.40 | STEREO | 96 | MAIN, 3.1 | 6 SEC |
| ABR7 416 | 480 | 270 | 1.78 | 29.97/30 | 1.00 | 0.90 | STEREO | 96 | BASELINE | 6 SEC |
| ABR8 418 | 480 | 180 | 1.78 | 29.97/30 | 0.70 | 0.60 | STEREO | 96 | BASELINE | 6 SEC |
| ABR9 420 | 320 | 180 | 1.78 | 29.97/30 | 0.47 | 0.44 | MONO | 32 | BASELINE | 6 SEC |
| ABR10 422 | 320 | 180 | 1.78 | 29.97/30 | 0.18 | 0.15 | MONO | 32 | BASELINE | 6 SEC |

FIGURE 4A

| 424 | HORIZONTAL 426 | VERTICAL 428 | ASPECT RATIO 430 | FRAME RATE 432 | TRANSPORT BIT-RATE (Mbps) 434 | VIDEO BIT-RATE (Mbps) 436 | STEREO/ MONO 438 | AUDIO BIT-RATE (kbps) 440 | PROFILE 442 | SEGMENT SIZE 444 |
|---|---|---|---|---|---|---|---|---|---|---|
| 4K ABR 1 (421) | 3840 | 2160 | 1.78 | 60 | 20 | 18 | STEREO 5.1 | 192 DD+ | HEVC MAIN (10) | 2 SEC |
| 4K ABR 2 (422) | 3840 | 2160 | 1.78 | 30 | 14.5 | 12.5 | STEREO 5.1 | 192 DD+ | HEVC MAIN | 2 SEC |

| FIGURE 4A |
| FIGURE 4B |

FIGURE 4

METHODS AND APPARATUS OF ENCODING REAL TIME MEDIA CONTENT

FIELD

The present invention relates to methods and apparatus for encoding and publishing with efficiency and speed a plurality of different versions of real time media content, e.g., video and/or audio content, of a content stream.

BACKGROUND

Currently, there are a number of systems that allow distributors and/or users to select and change the selection of the format of a media content stream during the streaming process. This allows the media content distributor and/or user to adjust the encoding format of the content being streamed to more efficiently use the available bandwidth. However, these systems typically have the media content to be streamed already encoded in various formats before the streaming begins and therefore do not have problems with processing, e.g., encoding, the content in real time into a plurality of formats while still maintaining synchronization of the encoded content. When content depicting live events is streamed, these systems have a number of drawbacks because the content needs to be processed into a plurality of formats in real time which is time consuming and complex to perform. In systems where the stream is serially encoded into different formats, the more encoded formats being offered for selection the longer the amount of time it requires to process the content into the different formats. Furthermore, if the processing is not done quickly enough content of the live event will be lost. Also to allow for the ability of the distributor and/or user to select between the different formats the encoded portions of content need to be synchronized otherwise once an initial format selection is done a selection to a different format will not be possible without gaps if the different encoded versions of the content as the different encoded versions of the content are made available at different times as soon as encoding is completed.

In view of the above discussion, there is a need for new methods and apparatus for efficient, high performance real time encoding and publishing of content streams so that an encoded stream can be made available in a plurality of formats in a synchronized manner allowing distributors or uses to dynamically in real time switch between different encoded formats during streaming.

SUMMARY

The present invention includes methods and apparatus directed to addressing one or more of the needs identified above. Various new methods and apparatus are described for processing such as for example, encoding, transcoding, and multiplexing, and/or transforming media content from one format to a plurality of formats. In some embodiments of the present invention, the content is a real time media stream from a live event such as a video and/or audio stream of the live event and the processing and/or transformation of the content stream from one format to a plurality of formats is performed using parallel processing techniques on portions of the content stream. In some embodiments the parallel processing techniques include the use of multiple processing blades, encoders and/or processors with each transforming portions of the stream into a different format and publishing the processed content at the same time thereby facilitating synchronized content delivery between streams formatted in different formats and/or for delivery at different data rates.

In various embodiments a content processing device receive content and identifies encoders to be used to encode the content in parallel into a variety of different formats or into versions corresponding to different data rates. The encoding maybe part of a transcoding operation with the content being received in encoded form for purposes of further processing, e.g., transcoding into a plurality of formats and data rates for distribution. By performing the transcoding into different formats using a plurality of encoding devices, multiple different formats and data rates, including high resolution formats and data rates, can be supported in real time. Thus content corresponding to a portion of a live program can be encoded and distributed in real time while the live event is ongoing.

The content processing device operates as a controller, controlling the distribution of content, e.g., the video and/or audio content corresponding to 2, 3 or 6 second portions of a program, to individual encoding units corresponding to different data formats and/or data rates. Different encoders may complete encoding of a segment at slightly different times. Rather than publish each version of the segment as encoding in a format is completed, the control device monitors to detect when the encoders working in parallel have successfully completed encoding into a plurality of formats and then publishes encoded versions the segment at the same time. This increases synchronization of the content delivery streams as opposed to cases where content corresponding to different formats is made available and streamed as soon as a segment is encoded. Thus, if a device switches between encoded data streams corresponding to different formats or data rates the streams will be relatively synchronized due to the controlled publication of segments in a manner intended to promote synchronization as each segment of a program, e.g., 2, 3, or 6 second segment, is encoded and made available in a variety of encoded formats and/or stream data rates.

While redundancy is often supported with a good encoder quickly being swapped for a encoder with a detected failure condition, this may introduce a delay or loss of content with respect to a stream corresponding to the failed encoder. While segments are normally published in a synchronized manner, if a fault condition with regard to an encoder is detected, the publication of segments encoded by the functional encoders is not delayed for purposes of synchronization with the segment normally produced by the failed encoder. In this way a fault with one encoder does not adversely impact the other streams being produced with synchronization between the publication of segments for functional encoders proceeding in a synchronized manner.

The parallel encoding and synchronized encoding techniques allow for the encoding and communication of content in a real time in a variety of data rates and formats even for high resolution content with little or no need for synchronization of content streams corresponding to the same program beyond that provided by the synchronized publication of segments being encoded in parallel.

One embodiment of the present invention is a method of encoding and distributing real time media content. The method includes the steps of receiving, at a content processing device at least a first portion of a first content stream; communicating the first portion of the content stream to a plurality of encoders including a first through Nth encoder, where N is an integer value greater than one, said first portion being one of a plurality of portions in said first content stream; operating said first through Nth encoders in parallel to perform different encoding operations in real time to generate first through Nth encoded versions of said first portion of content, respectively, each of the first through Nth encoded versions of said first content portion being different with respect to at least one of an encoding standard, content format, resolution or data rate to which the encoded version corresponds; monitoring the encoding status of each of the first through Nth encoders to determine completion of encoding of the first portion of the content stream by the first through Nth encoders or failure of one or more of the N encoders with regard to encoding said first portion of the first content stream; determining when at least the first through Nth encoders are done processing the first portion of the first content stream, said determining including determining on an individual per encoder basis whether the individual encoder has successfully completed encoding of the first portion of the first content stream or has encountered a failure with regard to encoding said first portion of the first content stream; and publishing, in response to determining that at least the first through Nth encoders are done processing the first portion of the content stream, at the same time, the successfully encoded versions of the first portion of the content stream.

Another embodiment of the present invention includes a content processing device for encoding and distributing real time media content. The content processing device including: an Input/Output (I/O) interface configured to receive at least a first portion of a first content stream; a plurality of encoders including a first through Nth encoder, where N is an integer value greater than one; a communications module configured to communicate the first portion of the content stream to the plurality of encoders, said first portion being one of a plurality of portions in said first content stream; said first through Nth encoders being configured to operate in parallel to perform different encoding operations in real time to generate first through Nth encoded versions of said first portion of content, respectively, each of the first through Nth encoded versions of said first content portion being different with respect to at least one of an encoding standard, content format, resolution or data rate to which the encoded version corresponds; a monitoring module configured to monitor the encoding status of each of the first through Nth encoders to determine completion of encoding of the first portion of the content stream by the first through Nth encoders or failure of one or more of the N encoders with regard to encoding said first portion of the first content stream; a determination module configured to determine when at least the first through Nth encoders are done processing the first portion of the first content stream, said determination including determining on an individual per encoder basis whether the individual encoder has successfully completed encoding of the first portion of the first content stream or has encountered a failure with regard to encoding said first portion of the first content stream; and a publishing module configured to publish in response to determining that at least the first through Nth encoders are done processing the first portion of the content stream, at the same time, the successfully encoded versions of the first portion of the content stream.

In some embodiments, the encoders are transcoders.

In some embodiments, the method further includes the additional step of storing encoded versions of the first portion of the content stream generated by different ones of said first through Nth encoders, as the encoders complete encoding different versions of said first portion of the content stream, said storing preceding determining that the first through Nth encoders are done processing the first portion of the content stream and preceding said publishing.

In some embodiments, in response to determining that one of said first through Nth encoders has encountered a failure with regard to encoding said first portion of the content stream, a failure condition indicator associated with said one of said first through Nth encoders is set and said one of said first through Nth encoders to have encountered a failure is treated as being in a failure condition with regard to encoding additional portions of the content stream until it is determined that said encoder is no longer subject to the detected encoding failure.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE DRAWINGS

FIG. 3 comprises the combination of FIG. 3A, FIG. 3B and FIG. 3C.

FIG. 3A illustrates a first part of an exemplary method in accordance with an embodiment of the present invention.

FIG. 4 comprises FIGS. 4A and 4B.

FIG. 4A illustrates a first part of an example of a set of information forming a portion of an ABR stack which provides parameters related to the different versions of an encoded fragment or segment of a content stream in accordance with one embodiment of the present invention.

FIG. 4B illustrates a second part of an example of a set of information forming a portion of an ABR stack which provides parameters related to the different versions of an encoded fragment or segment of a content stream in accordance with one embodiment of the present invention.

FIG. 5 comprises FIGS. 5A and 5B.

DETAILED DESCRIPTION

The present invention relates to methods and apparatus for encoding and distributing real time media content.

Figure 1:
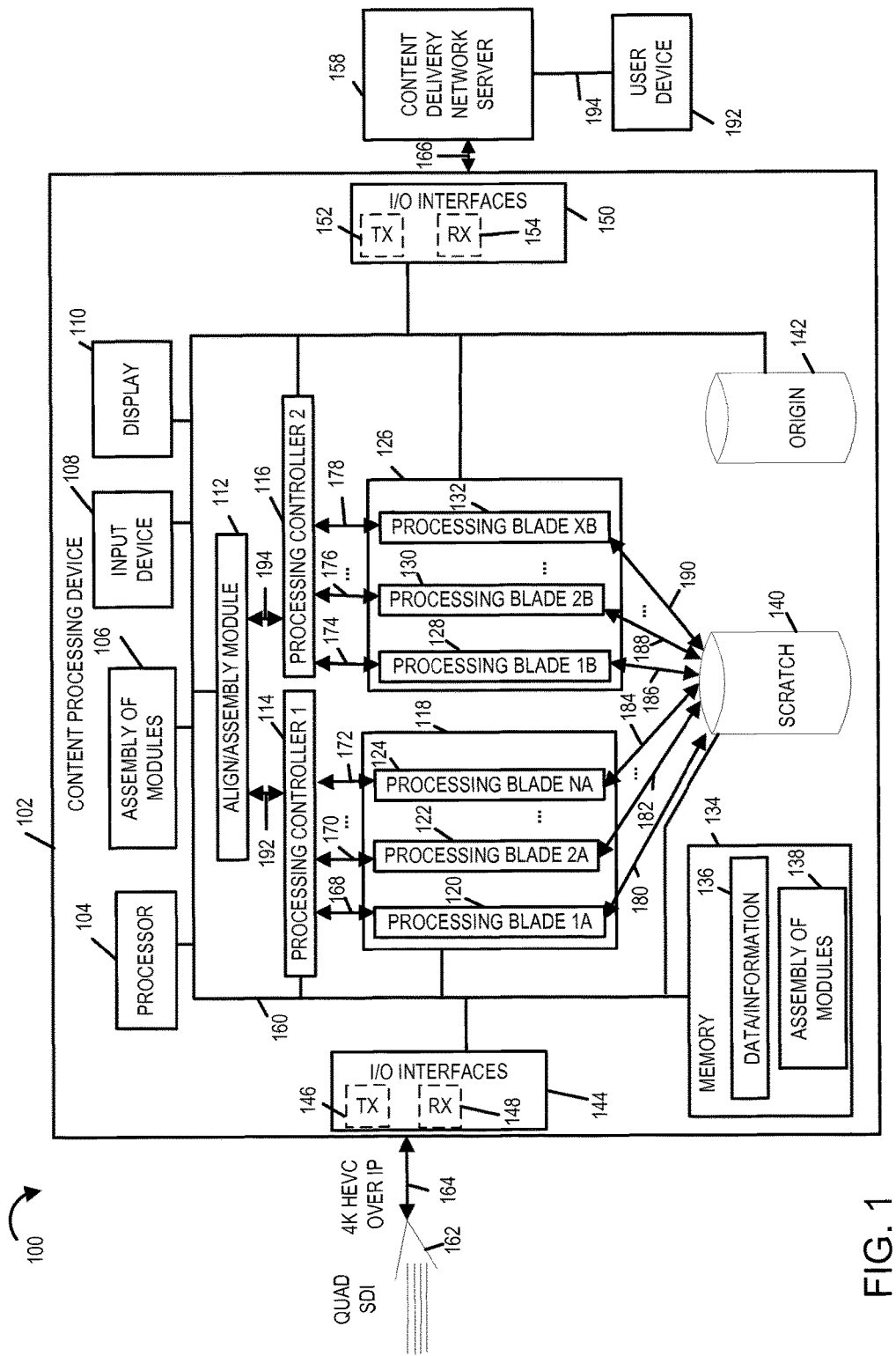
FIG. 1 illustrates an exemplary content processing device implemented in accordance with an exemplary embodiment of the invention.

FIG. 1 is a drawing illustrating an exemplary system 100 in accordance with an embodiment of the present invention. The exemplary system 100 includes a content processing device 102 and a content delivery network server 158. Coupled to the content delivery server via communications link 194 is a user device 192, e.g., a playback device such as for example a smartphone, computer, laptop, tablet, gaming console, etc. While only one user device 192 is shown it should be understood that a plurality of user devices are coupled to the content delivery server via a plurality of communications links. The content processing device 102 receives real time media streams, such as for example video streams of live events, over communications link 164, processes the real time media streams and distributes the processed content to a content delivery network. In this example, the content delivery processing device 102 distributes the processed real time media content streams over communications link 166 to content delivery network server 158.

The content processing device 102 includes a processor 104 e.g., a CPU, an assembly of modules 106, e.g., circuits corresponding to different modules, an input device such as a keyboard 108, a display 110, an Align/Assembly Module 112, a processing controller 1 114, a processing controller 2, 116, a first chassis 118, a second chassis 126, a memory 136, a scratch storage device 140, an origin storage device 142, I/O interfaces 146 and 150 which in some embodiments include transmitters 146 and 152 and receivers 148 and 154 respectively, which couple the content processing device to other networks and devices such as for example media generation equipment, content delivery network server 158, and networks such as for example the Internet and proprietary content delivery networks, coupled together via a bus 160 over which the various elements may interchange data and information. Memory 134 includes an assembly of modules 138, e.g., an assembly of software modules, and data/information 136. The assembly of modules 106 and/or 138 include modules for communicating over Internet Protocol networks, encoders and transcoders in some embodiments.

Included in chassis 172 are processing blade 1A, processing blade 2A, . . . , processing blade NA, where N is a positive integer value and each processing blade includes a different encoder. In some embodiments, one or more processing blades include transcoders. In some embodiments, one or more processing blades include two or more different encoders. The processing blades 120, 122, . . . , 124 are coupled to processing controller 1 114 via communication links 168, 170, . . . , 172 respectively. Processing blades 120, 122, . . . , 124 are coupled to scratch storage device 140 over communication links 180, 182, . . . , 184 respectively. The processing blades 120, 122, . . . , 124 are also coupled to the bus 160 via a backplane in the chassis 118 in order to be able to communicate with the other elements of the content processing device. Processing controller 1 114 is also coupled to align/assembly module 112 via communication link 192.

Included in chassis 126 are processing blade 1B, processing blade 2B, . . . , processing blade XB, where X is an integer which may be the same as or different from integer N. Each processing blade in chassis 126 includes a different encoder. In some embodiments, one or more processing blades include transcoders. In some embodiments, one or more processing blades include two or more different encoders. The processing blades 128, 130, . . . , 132 are coupled to processing controller 2 116 via communication links 174, 176, . . . , 178 respectively. Processing blades 128, 130, . . . , 132 are coupled to scratch database 140 over communication links 186, 188, . . . , 190 respectively. The processing blades 128, 130, . . . , 132 are also coupled to the bus 160 via a backplane in the chassis 126 in order to be able to communicate with the other elements of the content processing device. Processing controller 1 116 is also coupled to align/assembly module 112 via communication link 194.

The communication links 168, 170, . . . , 172, 174, 176, . . . , 178, 180, 182, . . . , 184, 186, 188, . . . , 190, 192, and 194 may be, and in some embodiments are high speed communication links. These communication links allow for the parallel communications between various elements of the content delivery device and increase speed and efficiency in processing, storing, and publishing real time media content.

In some embodiments in which Adaptive Bitrate (ABR) encoding is implemented the Align/Assembly Module 112 is an ABR Align/Assembly Controller module.

The processing blades of content processing device, may be, and in some embodiments are implemented as shown and described in connection with the processing device 200 of FIG. 2.

Figure 2:
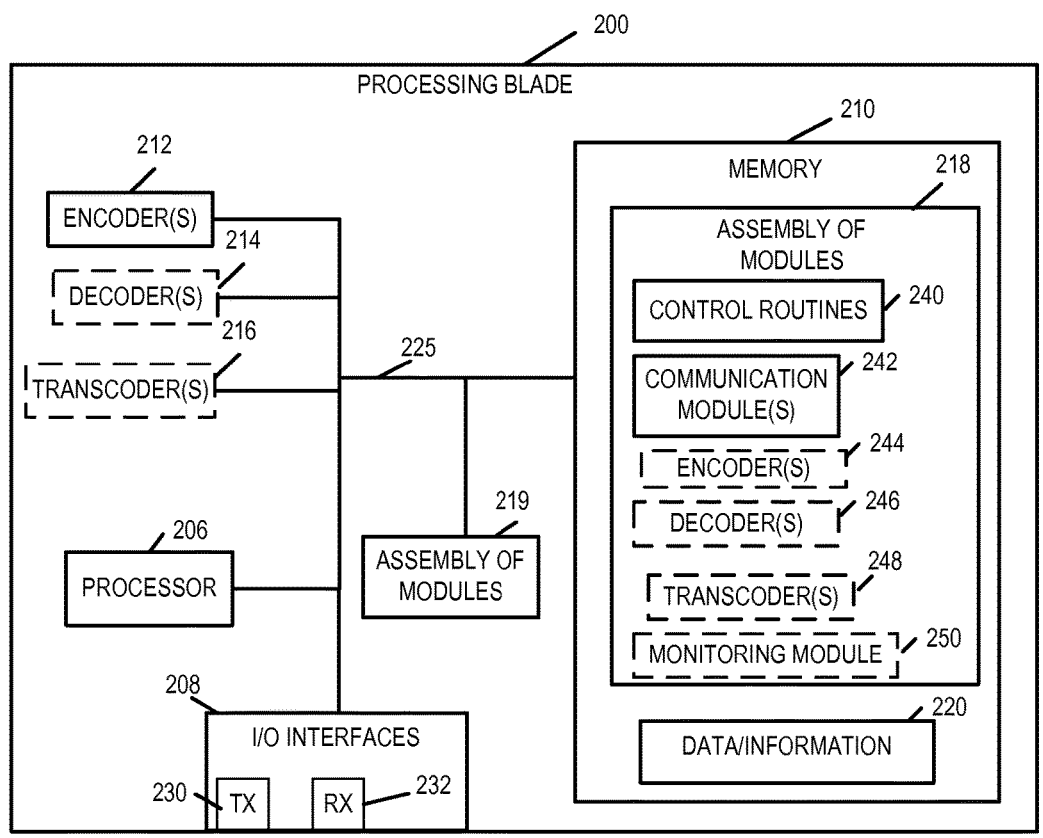
FIG. 2 illustrates an exemplary processing blade in accordance with an exemplary embodiment of the invention.

FIG. 2 illustrates an exemplary processing blade in accordance with an embodiment of the invention. The exemplary processing blade 200 includes a processor 206, e.g., a CPU, I/O interface 208 for communicating with other elements of the content processing device 102, a memory 210, encoder(s) 212 which may include one or more encoding devices, and an assembly of modules 219, e.g., circuits corresponding to different modules, coupled together via a bus 225 over which the various elements may interchange data and information. In some embodiments, the processing blade 200 includes decoder(s) 214 and/or transcoder(s) 216 which are coupled to the bus 225. Memory 210 includes an assembly of modules 218, e.g., an assembly of software modules, and data/information 220. In some embodiments, the assembly of modules 218 and/or 219 include an encoder(s) module 244 which includes one or more encoders, a decoder(s) module 246 which includes one or more decoders, and/or a transcoder(s) module 248 which may include one or more decoders for processing content. The assembly of modules 218 includes a control routines modules 240 with instructions when executed control the processor 206 to perform control functions including receiving content data; processing content data; encoding content data; storing information and data including content data and status condition information; generating status condition indications or messages such as for example indications or messages indicating encoding and/or processing successfully completed, failed or is still in on-going; responding to status condition queries, outputting processed and encoded content data and status information; controlling encoder(s), decoder(s), transcoder(s), I/O Interfaces and invoking various software modules to perform various tasks associated with the aforementioned activities. In some embodiments, the I/O Interface 208 includes a transmitter 230 and receiver 232. In some embodiments, the assembly of modules 218 and/or 219 include one or more communications modules 242 for communicating and exchanging data with various elements of the content processing device 102. In some embodiments, the assembly of modules 218 and/or 219 includes a monitoring module, e.g., monitoring module 250 for monitoring the status of encoding and processing of processes of a content stream. The exemplary processing blade may be, and in some embodiments is, used in the content processing device 102 of FIG. 1.

Figure 3B:
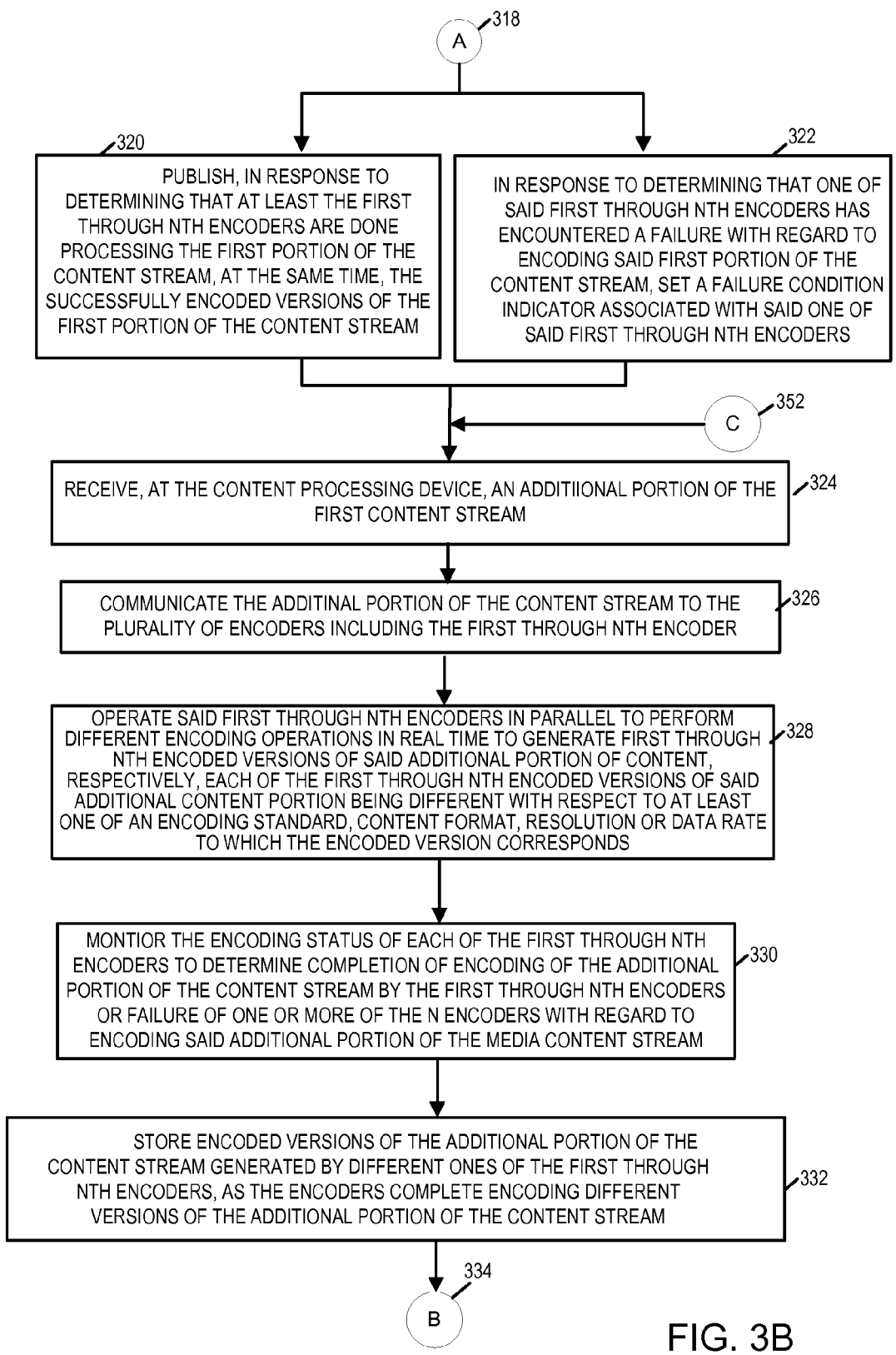
FIG. 3B illustrates a second part of an exemplary method in accordance with an embodiment of the present invention.
Figure 3C:
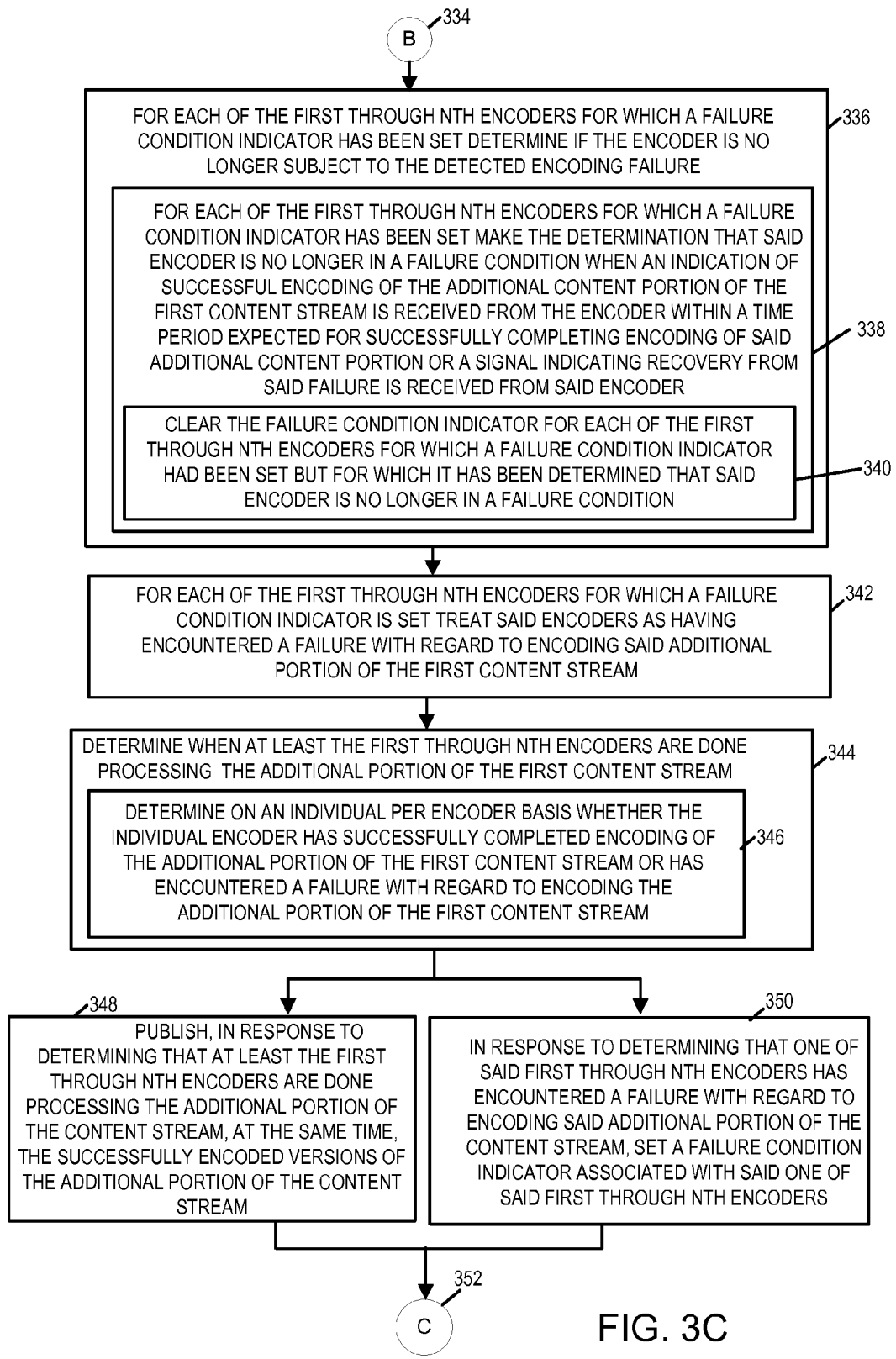
FIG. 3C illustrates a third part of an exemplary method in accordance with an embodiment of the present invention.

FIG. 3 consisting of a first part FIG. 3A and a second part FIG. 3B shows a flowchart 300 illustrating an exemplary method in accordance with an exemplary embodiment of the present invention. The exemplary method 300 will now be described in connection with the exemplary system 100 shown in FIG. 1.

In this example the video of a live event, such as for example a boxing match is being communicated via a first content media stream. The first content stream is formatted in High Efficiency Video Coding (HEVC) format in compliance with the H.265 standard and is communicated to the content processing device via quad serial digital interface 162 over the Internet on communication link 164. Operation of the method 300 begins at start method of encoding and distributing real time media content step 302. Operation proceeds from step 302 to step 304.

In step 304, the content processing device receives at least a first portion of a first content stream, e.g., a first portion of a content stream communication video corresponding to a live event. In this example the video being video of a boxing match. In some embodiments, the I/O Interface 144 receives the at least a first portion of the first content stream. In some embodiments, the receiver 148 of the I/O Interface 144 receives the at least a first portion of the first content stream. In most, but not all embodiments, the at least a first portion of the first content stream is the first portion of the content stream. In some embodiments, the first portion of the content stream as well as additional or subsequent portions of the content stream correspond to a predetermined time interval of video content. In some such embodiments, the predetermined interval of video content is a 2 or 6 second interval. Operation proceeds from step 304 to step 306.

In step 306, the first portion of the content stream is communicated to a plurality of encoders including a first through Nth encoder, where N is an integer value greater than one and the first portion being one of a plurality of portions in said first content stream. In some embodiments, the processor 104 executing instructions from a communication module performs this step. In some embodiments a communication module in the assembly of modules 106 performs this step. In some embodiments, the first portion of the content stream is communicated in parallel to N processing blades selected from the processing blades 1A 120, 2A 122, . . . , NA 124 included in the first chassis 118 and the processing blades 1B 128, 2B 130, . . . , XB 132 in the second chassis 126. Each of these processing blades being implemented in accordance with processing blade 200 of FIG. 2 and each containing a different encoder 212. In most, but not all embodiments, the encoders are hardware devices such as integrated circuits specifically optimized for high efficiency and speed encoding. In some embodiments, one or more of the encoders are implemented as either or software modules and may be, and in some embodiments, are contained in either the assembly of modules 106 and/or 138 of the content processing device. In some embodiments, the encoders are implemented in modules included in the processing blades, e.g., encoder module 244 of assembly of modules 218 or an encoder module of assembly of modules 219. In those embodiments, in which one or more encoders in the processing blades of the first or second chassis 118 or 126 are used the first portion of the content stream is communicated over the backplane of the respective chassis to the encoders via the receiver 232 of the processing blade I/O Interface 208. In some embodiments, the first portion of the content stream is communicated to one encoder, e.g., encoder 212 or 244 in each of the processing blades 1A 120, 2A 122, . . . , 2N 124 included in the first chassis 118. Operation proceeds from step 306 to step 308.

In step 308, the first through Nth encoders are operated in parallel to perform different encoding operations in real time to generate a first through Nth encoded versions of the first portion of content, respectively, each of the first through Nth encoded versions of the first content portion being different with respect to at least one of an encoding standard, content format, resolution or data rate to which the encoded version corresponds. In some embodiments, one or more of the encoders are transcoders, e.g., transcoder 216 included in each of the processing blades. In some of such embodiments prior to encoding the first portion of the content stream, the transcoder decodes the first portion of the content stream. The parallel encoding of the first content portion increases the speed with which the first portion is encoded and can be made available to the content distribution network. Operation proceeds from step 308 to step 310.

In step 310, the encoding status of each of the first through Nth encoders is monitored to determine the completion of encoding of the first portion of the content stream by the first through Nth encoders or failure of one or more of the N encoders with regard to encoding said first portion of the first content stream. In some embodiments, processing controller 1 114 controls and monitors the encoding status of the encoders included in processing blades 1A 120, 2A, 122, . . . , NA 124 performing the encoding operation via communication links 168, 170, . . . , 172 respectively to determine completion of the encoding of the first portion of the first content stream or the failure of one or more of the encoders with regard to encoding the first portion of the first content stream. Similarly, processing controller 2 controls and monitors the encoding status of the encoders included in processing blades 1B 128, 2B, 130, . . . , XB 132 performing the encoding operation via communication links 174, 176, . . . , 178 respectively to determine completion of the encoding of the first portion of the first content stream or the failure of one or more of the encoders with regard to encoding the first portion of the first content stream. In some embodiments, the Align/Assembly Module 112 also monitors the encoding status of the encoders included in processing blades 1A 120, 2A, 122, . . . , NA 124, 1B, 2B, . . . , XB performing the encoding operation via communication links 168, 170, . . . , 172, 174, 176, . . . , 178 via processing controller 1 114 and processing controller 2 116 via communications links 192 and 194 respectively to determine completion of the encoding of the first portion of the first content stream or the failure of one or more of the encoders with regard to encoding the first portion of the first content stream. In some embodiments, a monitoring module 250 from either the assembly of modules 219 or assembly of modules 218 in each of the processing blades performs this step. In some embodiments, the monitoring module is included in the assembly of modules 106 or 138 of the content processing device 102.

Operation proceeds from step 310 to step 312. In step 312, the encoded versions of the first portion of the content stream generated by different ones of the first through Nth encoders are stored as the encoders complete encoding different versions of the first portion of the content stream. In the exemplary embodiment, the encoded versions of the first portion of the first content stream are communicated from the encoders and stored in the scratch storage device 140. In those embodiments in which the N encoders are included in the processing blades the encoded versions of first portion of the first content stream is communicated from those processing blades that complete the encoding of the first portion of the content stream to the scratch storage device 140 as each encoder performing encoding completes the encoding operation. In some embodiments, the encoding versions of the first portion of the first content stream are stored in data/information portion 136 of memory 134 of the content processing device. Operation proceeds from step 312 to step 314.

In step 314, it is determined when at least the first through Nth encoders are done processing the first portion of the first content stream. Step 314 includes sub-step 316. In sub-step 316, a determination is made on an individual per encoder basis whether the individual encoder has successfully completed encoding of the first portion of the first content stream or has encountered a failure with regard to encoding the first portion of the first content stream. In the exemplary embodiment, the Align/Assembly module 112 performs this determination. In some embodiments, a determination module of the assembly of modules 106 or 138 performs this step. In the exemplary embodiment upon determining the encoding versions which have successfully completed, the Align/Assembly Module 112 retrieves the successfully encoded versions of the first portion of the first content stream from storage, e.g., either the scratch storage device 140 or the data/information memory 136 and stores the encoded versions in the origin storage device 142. In some embodiments, the encoded versions are directly stored in the origin storage device 142 upon completion of encoding. Operation proceeds from step 314 via connection node A 318 to step 320 and 322 illustrated on FIG. 3B.

In step 322, in response to determining that one of the first through Nth encoders has encountered a failure with regard to encoding said first portion of the first content stream, a failure condition indicator associated with the one or the first through Nth encoders is set. For example, a N bit register stored in data/information 136 of memory 134 with each of the N bits of the register associated with and corresponding to a different encoder of the N encoders. Upon determining that a failure has been encountered by one or more encoders during encoding of a portion of the content stream such as the first portion of the content stream the bits in the register corresponding to the one or more encoders that encountered the failure is set to indicate a failure condition with respect to that encoder and the encoding of the version of the portion of the first content stream being performed by that encoder. Operation proceeds from step 322 to step 324.

Step 320 may be performed in parallel with step 322 or serially before or after step 322. In step 320, in response to determining that at least the first through Nth encoders are done processing the first portion of the first content stream the successfully encoded versions of the first portion of the first content stream are published at the same time. In some embodiments, the publishing of each of the successfully processed versions of the first portion of the first content stream includes publishing information identifying where each of the successfully processed versions of the first portion of the first content stream is stored. In some of such embodiments, the information identifying where each of the successfully processed versions of the first portion of the first content stream is stored includes the addresses in a storage device in which the successfully encoded versions of the first portion of the first content stream is stored, e.g., the addresses in the origin storage device 142 where the successfully encoded versions of the first portion of the first content stream are stored. In some embodiments, publishing includes storing the information regarding the successfully encoded first content portions in a content delivery network server 158. In some embodiments, the Align/Assembly module 112 performs step 320. Once the successfully encoded versions of the first portion of the content stream are published they are available for download by user devices of the content distribution network. By publishing all of the successfully encoded versions of the first portion of the first content stream at the same time a user device has the ability to download the encoded version which is most suitable for the current network conditions and playback device. Operation proceeds from step 320 to step 324 where a subsequent or additional portion of the first content stream is received.

In step 324, an additional, i.e., subsequent, portion of the first content stream is received at the content processing device in the same manner as described in connection with step 304. Operation proceeds from step 324 to step 326. In step 326, the additional portion of the content stream is communicated to the plurality of encoders including the first through Nth encoder in the same manner as described in connection with step 306. Operation proceeds from step 326 to step 328.

In step 328, the first through Nth encoders are operated in parallel as described in connection with step 308 to perform different encoding operations in real time to generate first through Nth encoded versions of the additional portion of the content, respectively, each of the first through Nth encoded versions of the additional content portion being different with respect to at least one of an encoding standard, content format, resolution or data rate to which the encoded version corresponds. Operation proceeds from step 328 to step 330.

In step 330, the encoding status of each of the first through Nth encoders is monitored as described in connection with step 310 to determine completion of encoding of the additional portion of the content stream by the first through Nth encoders or failure of one or more of the N encoders with regard to encoding said additional portion of the first content stream. Operation proceeds from step 330 to step 332.

In step 332, the encoded versions of the additional portion of the first content stream generated by different ones of the first through Nth encoders, are stored as the encoders complete encoding different versions of the additional portion of the first content stream. Operation proceeds from step 332 via connection node B 334 to step 336 illustrated on FIG. 3C.

In step 336, for each of the first through Nth encoders for which a failure condition indicator has been set determine if the encoder is no longer subject to the detecting encoding failure. Step 336 may, and in some embodiments does, include sub-step 338. In step 338 a determination is made for each of the first through Nth encoders for which a failure condition indicator has been set that said encoder is no longer in a failure condition when an indication of successful encoding of the additional content portion of the first content stream is received from the encoder within a time period expected for successfully completing encoding of said additional content portion or a signal indicating recovery from said failure is received from said encoder. In some embodiments, sub-step 338 includes sub-step 340. In step 340, the failure condition indicator is cleared for each of the first through Nth encoders for which a failure condition indicator had been set but for which it has been determined that said encoder is no longer in a failure condition. In some embodiments, this is implemented by clearing a bit in a register associated with or corresponding to the encoder. In some embodiments, this step is performed by the element monitoring the encoder such as for example, processing controlling 1114, Align/Assembly module 112, or a monitoring module. Operation proceeds from step 336 to step 342.

In step 342, for each of the first through Nth encoders for which a failure condition indicator is set treat said encoders as having encountered a failure with regard to encoding said additional portion of the first content stream. Operation proceeds from step 342 to step 344.

In step 344, determine when at least the first through Nth encoders are done processing the additional portion of the first content stream. Step 344 includes step 346. In step 346 determine on an individual per encoder basis whether the individual encoder has successfully completed encoding of the additional portion of the first content stream or has encountered a failure with regard to encoding the additional portion of the first content stream. Steps 344 and 346 are implemented as described in connection with steps 314 and 316. Operation proceeds from step 346 to steps 348 and 350.

In step 350, in response to determining that one of said first through Nth encoders has encountered a failure with regard to encoding said additional portion of the content stream, a failure condition indicator associated with and corresponding to the said one of said first through Nth encoders is set as described in connection with step 322.

In step 348, in response to determining that at least the first through Nth encoders are done processing the additional portion of the content stream, the successfully encoded versions of the additional portion of the content stream is published at the same time. The operation of step 348 is performed in the same manner as describe in connection with 320.

Steps 348 and 350 may be, and in some embodiments are, performed in parallel. The steps 348 and 350 may also be performed in sequential order the ordering not being important. Operation proceeds from step 348 and 350 via connection node C 352 to step 324 shown on FIG. 3B where the processing continues for the next additional or subsequent portion of the first content stream.

In some embodiments, the first content portion and subsequent or additional content portions correspond to a predetermined time interval of video content. In some of such embodiments, the predetermined interval of video content is a 2 or 6 second interval. In some embodiments, the predetermined interval of video content is in the range of 2 seconds to 10 seconds.

In some embodiments the first content stream is a content stream communicating video corresponding to a live event, said encoding and publishing occurring while live event such as for example a boxing match is on-going.

In some embodiments the first portion of the first content stream corresponds to a first segment or fragment of a media presentation. In some embodiments, the media presentation is one of a live television program, radio program, podcast or an advertisement.

In some embodiments, the first content portion is a HTTP-based file segment containing 2 seconds of playback time media content of a first media content stream encoded at a first bit rate an each of the plurality of versions of the first portion of the received media content is a separate HTTP-based file segment containing the same 2 seconds of playback time media content encoded differently with respect to at least one of an encoding standard, content format, resolution or data rate to which the encoded version corresponds.

In some embodiments, the first portion of the first content stream includes a portion of audio or video. In some embodiments in which the first content portion includes video, the video includes a group of pictures and when the encoded versions of the first portion of the first content stream are published at the same time, the method 300 results in the Group of Pictures being aligned 4K Adaptive Bit-Rate outputs.

In some embodiments, the first portion of the first content stream includes a group of motion pictures and associated audio. In some embodiments, the first portion of the first content stream includes one or more audio visual objects.

In some embodiments of the exemplary method, the publishing of each of the successfully processed versions of the first portion of the received first content stream is performed by an aligner assembler controller wherein prior to publishing the aligner assembler controller queries, each of the processing blades including an encoder which has been determined to have successfully completed its processing of the first portion of the first content stream, for an address of the location in the storage device or memory in which the processing blade stored its encoded version of the first portion of the first content stream.

In some embodiments, a predetermined time interval is set to complete the encoding of the first portion of the first content stream and if an encoder does not complete the encoding within the predetermined time interval the encoder is determined to have encountered a failure so as to not hold up the publishing of the versions of the successfully encoded versions of the first portion of the first content stream. In some embodiments, when a version of the encoding of the first portion or an additional portion of the first content stream is not successfully completed within the predetermined time interval, that version of the encoded first portion or additional portion of the first content stream is not published so that alignment of the plurality of encoded versions of the first portions of the first content stream is maintained.

In some embodiments of the method, adaptive bit rate (ABR) streaming of live events is implemented wherein the first content stream is a multi-media stream of video content and wherein the first portion of content of the first content is encoded by said N encoders in parallel generating N versions of the first portion of the content at N different bitrates and publishing the availability of the N different versions of the first portion of the first content stream at the same time. Subsequent portions of the first content stream are similarly encoded in parallel with N versions of each of the subsequent portions being published at the same time. In some of such embodiments, the first and subsequent portions of content are distributed to user devices, e.g., user device 192, in a content delivery network in response to HTTP requests from the user devices, such as for example, computers, smartphones, laptops, tablets, internet enabled set-top boxes, and gaming consoles. Because the publication of the N versions of each of the encoded portions is done at the same time the user requests may, and in some embodiments do, chose different encoded versions for different portions of the video content stream without delays or gaps.

In some embodiments, the method 300 is used for encoding and publishing portions of a content stream in a dynamic adaptive streaming over HTTP (DASH) also known as an MPEG-DASH system. In some embodiments, the method 300 is used for encoding and publishing portions of a content stream in devices and/or systems employing HTTP Live Streaming (HLS) communications protocol such as Apple HTTP Live Streaming. In some embodiments, the method 300 is used for encoding and publishing portions of a content stream in devices and/or systems employing Smooth Streaming communications protocol such as Microsoft Smooth Streaming.

In some embodiments, the method 300 is used for encoding and publishing portions of a content stream in devices and/or systems implementing two or more of the following communications protocols and/or techniques simultaneously DASH, HTTP Live Streaming (HLS), and Smooth Streaming. In some of such embodiments, the content processing device includes a chassis dedicated to encoding and publishing portions of the content stream in each of the communications protocols that is one chassis for DASH, one chassis for HTTP Live Streaming (HLS) and one chassis for Smooth Streaming. In some of such embodiments, the publications of the successfully encoded versions of the first content stream occur simultaneously with respect to the completion of processing of the portion of the first content stream for each of the individual communication protocols. For example, when the processing for the encoding of the N versions of the first portion of the content stream completes with respect to the first chassis which may be supported DASH the N encoded versions for the DASH protocol are published at the same but may be published at a different time from when all of the N encoded versions of the second chassis supporting HLS are published or when all of the N encoded versions of the third chassis supporting Smooth Streaming. In some of such embodiments the number N may be different non-zero integer values for each of the communications systems being supported. Each of the processing blades may, and in some embodiments, is dedicated to generating the plurality of versions for a particular protocol communication such as the Apple HTTP Live Streaming communications protocol. In such embodiments, each of such processing blades has a plurality of N different encoders for generating the N versions of each portions of the content stream.

In some embodiments, the first chassis 118 and second chassis 126 include the same number of processing blades and the processing blades in the second chassis are a duplicate of the processing blades in the first chassis. In some of such systems, the first chassis and processing blades included in the first chassis 118 are active and process the portions of the first content stream which are received by the content processing device 102 during this time the second chassis and processing blades are in standby mode and do not process the received portions of the first content stream. Upon a detection of a failure condition of the first chassis or one or more blades in the first chassis, the second chassis 126 begins processing subsequent portions of the first content stream received. In some embodiments, the processing blades of the first and second chassis 172 and 178 both process the same portions of the first content stream and when it is determined that an encoder in a processor blade of the first chassis 118 has failed to successfully encode a portion of the content stream the duplicate encoder in the duplicate processor blade of the second chassis 126 is queried prior to publishing the encoded versions of the portion of the first content stream to determine if it has successfully completed encoding the portion of the first content stream. If the duplicate encoder has completed processing the portion of the first content stream, that version of encoded portion of the content stream will be included when the versions of the portion of the first content stream are published.

While receiving and processing of portions of the first content stream are shown as occurring sequential in the flowchart of method 300, in some embodiments the receiving and processing of additional portions of the content stream may occur in parallel. For example, in some embodiments the processing of the first portion of the first content stream is performed by the processing blades of the first chassis while the processing of the second portion of the first content stream is performed in parallel by the processing blades of the second chassis. In such systems, the align/assembly module ensures publication of the N encoded versions of the first portion of the first content stream before the N encoded versions of the second portion of the first content stream. In this way, processing of the portions of the content stream may be performed more efficiently and quickly. In some embodiments in which portions of the first content stream are processed in parallel the align/assembly module assigns which processing blades from the first or second chassis perform encoding for each portion of the first content received wherein processing from the first and second chassis may be involved in processing the same portion of the first content stream.

In some embodiments, the first chassis of processing blades 118 is dedicated to processing portions of content from the first content stream and the second chassis of processing blades 126 is dedicated to processing portions of content from a second content stream.

In some embodiments, one or more processing blades in the first and/or second chassis are reserved as backup processing blades that are only communicated portions of the first content stream to process after a failure indication of one of the non-reserved processing blades of the first or second chassis. In some embodiments, the non-reserved processing blades of the first and/or second chassis include a single encoder each of these encoders being different and the back-up processing blades include a plurality of different encoders, the plurality of different encoders including one encoder for each different encoders included in the non-reserve processing blade.

In some embodiments, the first portion of the content stream is apportioned into sub-portions and it is the sub-portions which are sent to 1 to N encoders for encoding. The 1 to N encoders operate to encode each of the sub-portions to generate a single ABR presentation for the first portion of the content. In some of such embodiments, each of the processing blades of FIG. 1 includes multiple encoders that each encode a different sub-portion of a single ABR profile representation for the first portion and therein collectively encode the entire first ABR profile representation for the first portion. Synchronization for the completion of the first ABR profile presentation is achieved by first monitoring the completion of the first ABR profile representation along with the completion of the remaining ABR profile presentations for the first portion of the content stream. The remaining ABR profiles will be completed in parallel in the same manner as the first ABR profile presentation.

Only after determining that processing of the 1 to N encoders for each of the sub-portions of each of the different ABR profile presentations is done, are the different encoded versions of the ABR profiles of the first portion of the content stream published. This publication occurs at the same time so that synchronization of the publication of the ABR profiles for the first portion of the content stream is maintained. In some of such embodiments, subsequent portions of the content stream are similarly processed by apportioning each of the subsequent portions in sub-portions and then encoding the sub-portions in parallel. In this way by distributing the encoding processing related to each of the sub-portions of each ABR profile representation while still monitoring and ensuring the publication of the different ABR profile representations in a synchronized manner, multiple ABR profiles can be provided for real time content streams of live events without losing content.

Another exemplary embodiment of the present invention will now be described in connection with the elements of the system of FIG. 1. In this exemplary embodiment high performance and real time media content processing synchronization across dispersed hardware is used for obtaining Group of Picture (GOP) 4K Adaptive Bit rate (ABR) outputs. In order to achieve this the system includes a control plane and messaging bus that supports IP multicast across all chassis and a farm of generic computing components. The system uses forward error correction (FEC) to achieve network resiliency and achieves processing redundancy through N+1 redundancy which ensures system availability in the event of a single encoding component failure. The system having N computing components that perform encoding and at least one independent backup computing component that performs encoding, i.e., N+1 computing components.

The system also includes one or more process controllers that will perform and keep track of assigning encoding including scaling and re-sampling) tasks to the computing components, e.g., processing blades. Each of the one or more process controllers will utilize a plurality of communication layers including a first communication layer between encoding sessions and a second communication layer between align/assembly. The process controller will perform the following operations: (i) submits encode task to an attached computing component, (ii) periodically polls the computing component for encode task progress, (iii) upon determining that all encode tasks for a Fragment X, a media presentation, have a status of "complete", the acting process controller will signal the Aligner/Assembler controller of the task completion, (iv) upon determining failures (or error conditions), the process controller will also either signal/ loop back the error conditions of the encode tasks to the applicable process.

Each of the generic computing devices may, and in some embodiments does, process an entire ABR fragment (across all representations). In some embodiments, the generic computing device processes a single fragment of a single representation. In some embodiments, the generic computing devices are configurable so that they can be configured to process an entire ABR fragment (across all representations) or a single fragment of a single representation. In some embodiments, each of the generic computing devices or computing platforms processes a portion of a 4K ABR fragment profile of a single representation. In some of such embodiments, multiple computing devices or computing platforms are included in each of the processing blades of FIG. 1.

Once a "complete" indication such as for example a message is received by a process controller from a computing device this status is provided to the aligner/assembler controller. When a "complete" indication is received for all encode threads responsible for an ABR fragment by the align/assembler controller, the align/assembler controller will assemble all the pieces, i.e., all different encoded versions and publish the assembled encoded versions to an origin server. Alternatively, in some embodiments the different encoded versions of the ABR fragment is written to RAM instead of to a Storage Area Network or network storage servers. In some embodiments in which each computing device or platform is processing a portion of a 4K ABR fragment profile of a single representation, the aligner/ assembler controller will monitor the status of the completion of the encoding of each portion of the 4K ABR fragment profile as well as the completion of the encoding of the entire 4K ABR fragment profile across each of the different ABR presentations.

The align/assembler controller will perform the following operations: (i) polls each process controller for status of media fragmentation synchronization, (ii) once an ABR stack (fragment across all representations) is "complete", the aligner/assembler controller will query each process controller for the storage locations of all video fragments, and (iii) once all storage locations are returned the aligner/ assembler controller will publish each video fragment to the control delivery network which guarantees the fragments for that period of time, are available for all ABR representations (or stack).

In some embodiments, the method and system which accomplish the real time processing of high resolution/high bit-rate media content is implemented and operated on a bare metal platform environment, e.g., as a virtual machine installed directly on computer hardware rather than within the operating system of a computer. In some embodiments, the method and system which accomplish the real time processing of high resolution/high bit-rate media content is implemented and operated in virtualized environments such as for example, VMware or OpenStack frameworks.

The parallel processing techniques, apparatus, methods and systems of the present invention may be applied to a variety of processing tasks including encoding, transcoding, multiplexing or other forms of transformation of media content from one format to another or multiple formats across computing devices, e.g., generic computing devices.

Table 400 of FIG. 4 illustrates an example of a set of information forming a portion of an ABR stack which provides parameters related to the different versions of an encoded fragment or segment of a Apple HTTP Live Streaming (HLS) High Definition (HD) content stream in accordance with one embodiment of the present invention. Table 400 spans FIG. 4A and FIG. 4B. FIG. 4 comprises FIGS. 4A and 4B. FIG. 4A illustrates the first part of the table 400 and FIG. 4B illustrates the second part of the table 400. Row 401 is not part of the ABR information but has been included for explanatory purposes. Row 401 includes information describing the parameters included in each column of the table 400. Each of the rows of table 400 excluding row 401 includes information pertaining to the same fragment or segment of the Apple HTTP Live (HLS) HD stream encoded for a different Adaptive Bit Rate (ABR). Column 424 identifies the Adaptive Bit Rate encoding scheme. Column 426 identifies the horizontal number of lines per image, e.g., frame. Column 428 identifies the vertical number of lines per image, e.g., frame. Column 430 identifies the aspect ratio of the image, e.g., frame. Column 432 identifies the frame rate, e.g., frames per second. Column 434 identifies the transport bit-rate that is the number of bits per second to be used to transmit the segment content and is given in Mbps (megabits per second). Column 436 identifies the video bit-rate which is the bits per second used to communicate the video portion of the segment. The video bit-rate is provided in Mbps. Column 438 identifies the type of audio content, e.g., stereo or mono. Column 440 identifies the audio bit-rate which is the number of bits per second at which the audio content is encoded. The audio bit-rate is provided in kbps (kilobits per second). Column 442 identifies an encoding profile used to encode the segment. Column 444 identifies the segment size which is the number of seconds of content included in the segment. Row 402 includes information related to the ABR-Classic format. Row 404 includes information related to the ABR1 format. Row 406 includes information related to the ABR2 format. Row 408 includes information related to the ABR3 format. Row 410 includes information related to the ABR4 format. Row 412 includes information related to the ABR5 format. Row 414 includes information related to the ABR6 format. Row 416 includes information related to the ABR7 format. Row 418 includes information related to the ABR8 format. Row 419 includes information related to the ABR9 format. Row 420 includes information related to the ABR10 format. Row 421 shown on FIG. 4B includes information related to the 4K ABR 1 format. Row 422 shown on FIG. 4B includes information related to the 4K ABR 2 format. For example, row 408 provides the following information regarding ABR3 encoded segment. Column 426, row 408 entry identifies the horizontal number of lines per image, e.g., frame, to be 1280. Column 428, row 408 entry identifies the vertical number of lines per image, e.g., frame, to be 720. Column 430, row 408 entry identifies the aspect ratio of the image, e.g., frame, to be 1.78. Column 432, row 408 entry identifies the frame rate, e.g., frames per second, to be 29.97 or 30. Column 434, row 408 entry identifies the transport bit-rate to be 4.5 Mbps. Column 436, row 408 entry identifies the video bit-rate to be 4.5 Mbps. Column 438, row 408 entry identifies the type of audio content as stereo. Column 440, row 408 entry identifies the audio bit-rate to be 96 kbps. Column 442, row 408 entry identifies the encoding profile used to encode the segment as HIGH, 4.1 which indicates H.264 High Profile Level 4.1. Column 444, row 408 entry identifies the segment size which is the number of seconds of content included in the segment as 6 seconds. Each of the other rows of table 400 excluding row 401 similarly contains information pertaining to the same segment encoded in a different ABR format as discussed above. The encoding profile column 440 references AVC H.264 for classic and ABR-1 to ABR-10 formats and references HEVC H.265 for ABR 1 4K and ABR 2 4K format profiles. The DD+ in the chart for audio bit rate entry refers to Dolby Digital Plus.

Figure 5A:
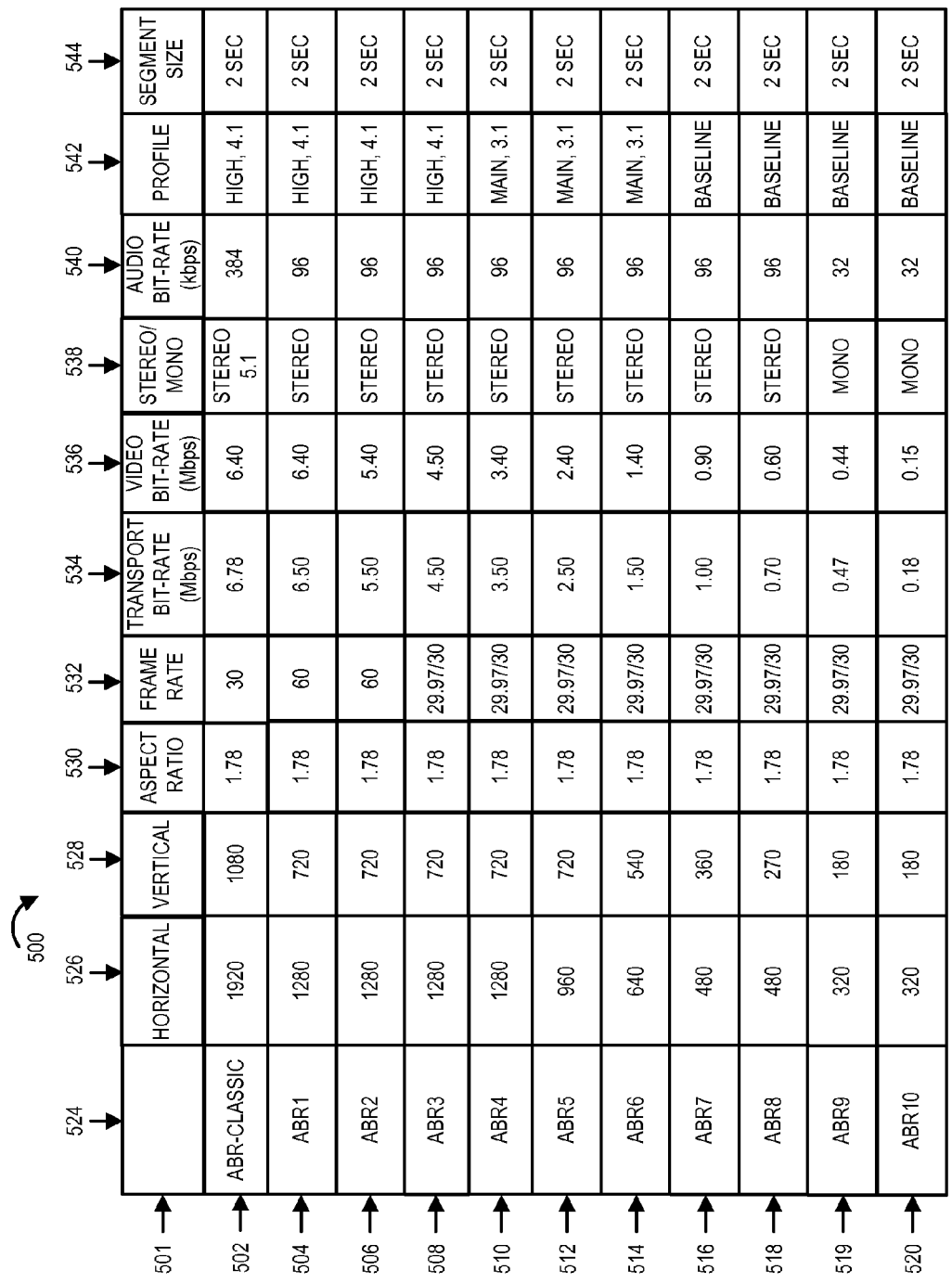
FIG. 5A illustrates a first part of an example of a set of information forming a portion of an ABR stack which provides parameters related to the different versions of an encoded fragment or segment of a content stream in accordance with one embodiment of the present invention.
Figure 5B:
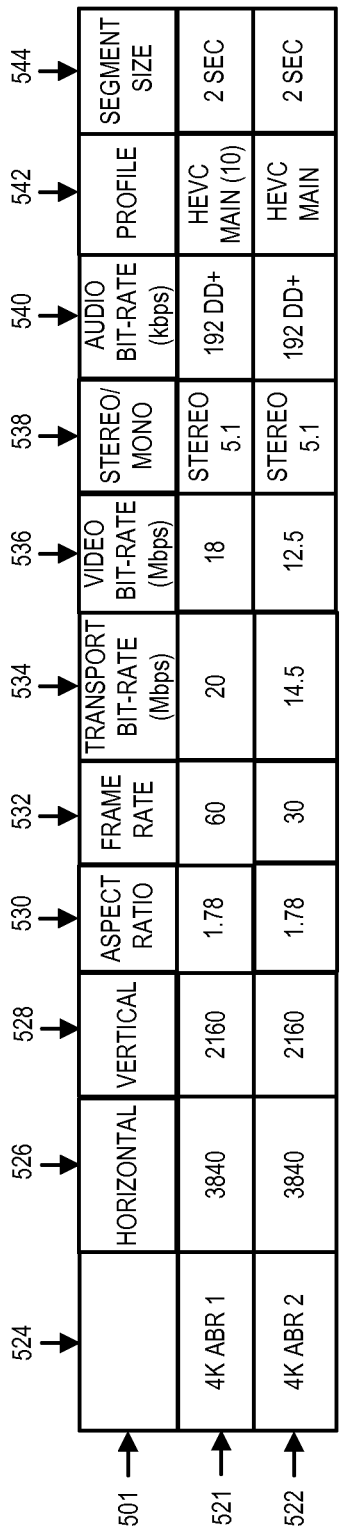
FIG. 5B illustrates a second part of an example of a set of information forming a portion of an ABR stack which provides parameters related to the different versions of an encoded fragment or segment of a content stream in accordance with one embodiment of the present invention.

Table 500 of FIG. 5 illustrates an example of a set of information forming a portion of an ABR stack which provides parameters related to the different versions of an encoded fragment or segment of a Smooth Streaming High Definition (HD) content stream in accordance with one embodiment of the present invention. Table 500 spans FIG. 5A and FIG. 5B. FIG. 5 comprises FIGS. 5A and 5B. FIG. 5A illustrates the first part of the table 500 and FIG. 5B illustrates the second part of the table 500. Row 501 is not part of the ABR information but has been included for explanatory purposes. Row 501 includes information describing the parameters included in each column of the table 500. Each of the rows of table 500 excluding row 501 includes information pertaining to the same fragment or segment of the Apple HTTP Live (HLS) HD stream encoded for a different Adaptive Bit Rate (ABR). Column 524 identifies the Adaptive Bit Rate encoding scheme. Column 526 identifies the horizontal number of lines per image, e.g., frame. Column 528 identifies the vertical number of lines per image, e.g., frame. Column 530 identifies the aspect ratio of the image, e.g., frame. Column 532 identifies the frame rate, e.g., frames per second. Column 534 identifies the transport bit-rate that is the number of bits per second to be used to transmit the segment content and is given in Mbps (megabits per second). Column 536 identifies the video bit-rate which is the bits per second used to communicate the video portion of the segment. The video bit-rate is provided in Mbps. Column 538 identifies the type of audio content, e.g., stereo or mono. Column 540 identifies the audio bit-rate which is the number of bits per second at which the audio content is encoded. The audio bit-rate is provided in kbps (kilobits per second). Column 542 identifies an encoding profile used to encode the segment. Column 544 identifies the segment size which is the number of seconds of content included in the segment. Row 502 includes information related to the ABR-Classic format. Row 504 includes information related to the ABR1 format. Row 506 includes information related to the ABR2 format. Row 508 includes information related to the ABR3 format. Row 510 includes information related to the ABR4 format. Row 512 includes information related to the ABR5 format. Row 514 includes information related to the ABR6 format. Row 516 includes information related to the ABR7 format. Row 518 includes information related to the ABR8 format. Row 519 includes information related to the ABR9 format. Row 520 includes information related to the ABR10 format. Row 521 shown on FIG. 5B includes information related to the 4K ABR 1 format. Row 522 shown on FIG. 5B includes information related to the 4K ABR 2 format. For example, row 508 provides the following information regarding ABR3 encoded segment. Column 526, row 508 entry identifies the horizontal number of lines per image, e.g., frame, to be 1280. Column 528, row 508 entry identifies the vertical number of lines per image, e.g., frame, to be 720. Column 530, row 508 entry identifies the aspect ratio of the image, e.g., frame, to be 1.78. Column 532, row 508 entry identifies the frame rate, e.g., frames per second, to be 29.97 or 30. Column 534, row 508 entry identifies the transport bit-rate to be 4.5 Mbps. Column 536, row 508 entry identifies the video bit-rate to be 4.5 Mbps. Column 538, row 508 entry identifies the type of audio content as stereo. Column 540, row 508 entry identifies the audio bit-rate to be 96 kbps. Column 542, row 508 entry identifies the encoding profile used to encode the segment as HIGH, 4.1 which indicates H.264 High Profile Level 4.1. Column 544, row 508 entry identifies the segment size which is the number of seconds of content included in the segment as 2 seconds. Each of the other rows of table 500 excluding row 501 similarly contain information pertaining to the same segment encoded in a different ABR format as discussed above. The encoding profile column 540 references AVC H.264 for classic and ABR-1 to ABR-10 formats and references HEVC H.265 for ABR 1 4K and ABR 2 4K format profiles. The DD+ in the chart for audio bit rate entry refers to Dolby Digital Plus.

Figure 6:
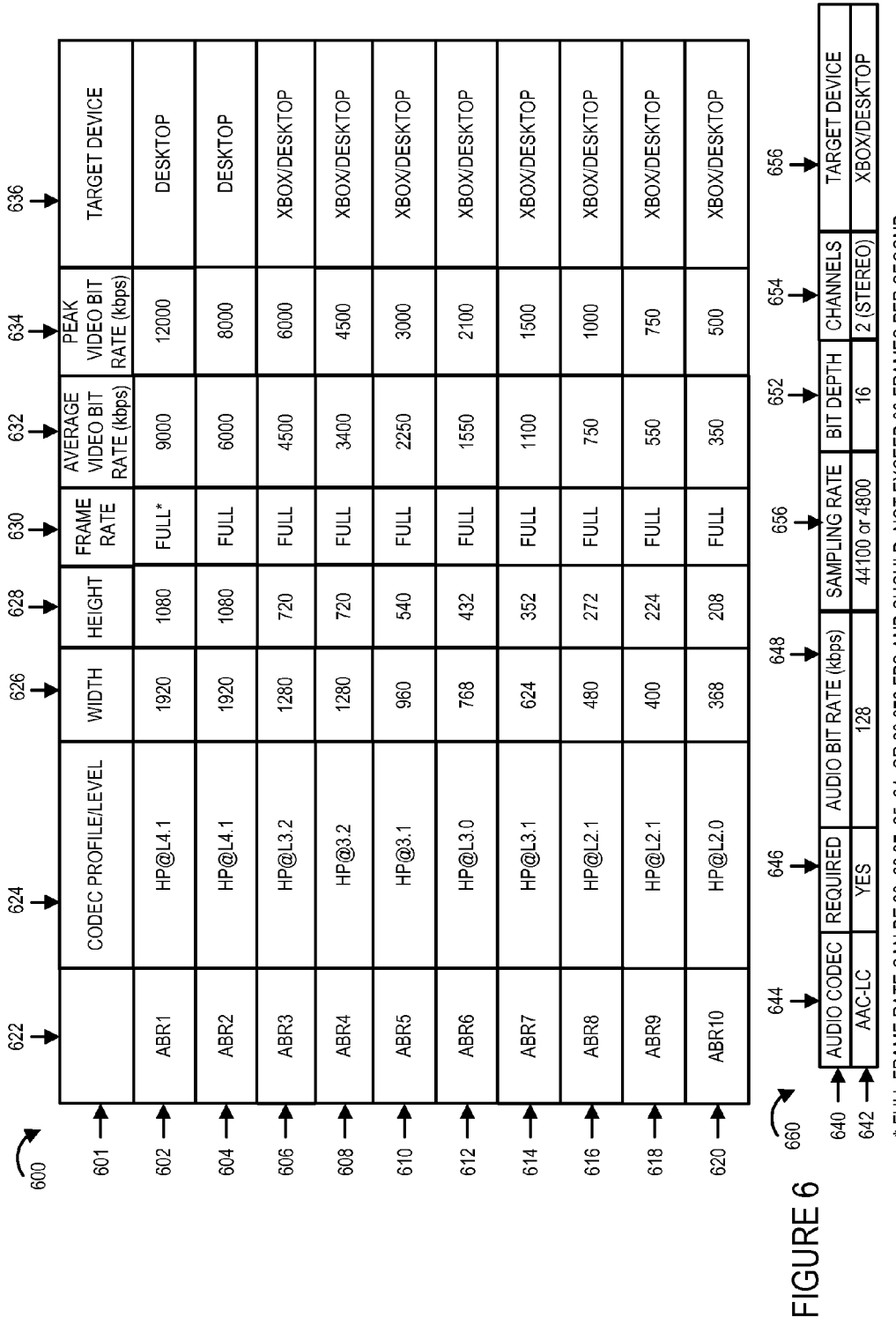
FIG. 6 illustrates an example of a set of information forming a portion of an ABR stack which provides parameters related to the different versions of an encoded fragment or segment of a content stream in accordance with one embodiment of the present invention.

Tables 600 of FIG. 6 illustrate an example of a set of information forming a portion of an ABR stack which provides parameters related to the different versions of an encoded fragment or segment of a MS 16:9 and other widescreen aspect ratio video content of the content stream while table 660 illustrates exemplary information forming a portion of the ABR stack providing parameters relating to the encoded audio content of the content stream in accordance with one embodiment of the present invention.

The information contained in table 600 will now be described. Row 601 is not part of the ABR information but has been included for explanatory purposes. Row 601 includes information describing the parameters included in each column of the table 600. Each of the rows of table 600 excluding row 601 includes information pertaining to the same fragment or segment of encoded content for a different Adaptive Bit Rate (ABR). Column 622 identifies the Adaptive Bit Rate encoding scheme. Column 624 identifies a codec profile and level used to encode the segment. Column 626 identifies the width of the image, e.g., frame in number of pixels per horizontal line. Column 628 identifies the height of the image, e.g., frame in number of pixels per vertical line. Column 630 identifies the frame rate, e.g., frames per second. Column 632 identifies the average video bit-rate which is the average number of bits per second used to communicate the video portion of the segment and is given in kbps (kilobits per second). Column 634 identifies the peak video bit-rate which is the maximum or highest number of bits per second used to communicate the video portion of the segment. The video bit-rate is provided in kbps. Column 636 identifies the target device. Row 602 includes information related to the ABR1 format. Row 604 includes information related to the ABR2 format. Row 606 includes information related to the ABR3 format. Row 608 includes information related to the ABR4 format. Row 610 includes information related to the ABR5 format. Row 612 includes information related to the ABR6 format. Row 614 includes information related to the ABR7 format. Row 616 includes information related to the ABR8 format. Row 618 includes information related to the ABR9 format. Row 620 includes information related to the ABR10 format. For example, row 608 provides the following information regarding ABR4 encoded segment. Column 624, row 608 entry indicates the codec profile and level used in encoding the segment as H.264 High Profile Level 3.2. Column 626, row 608 entry indicates the width of the image as 1280 pixels. Column 628, row 608 entry indicates the height of the image as 720 pixels. Column 630, row 608 entry indicates the frame rate as FULL. Footnote 638 indicates that the full frame rate can be 30, 29.97, 25, 24, or 23.976 frames per second (fps) and should not exceed 30 frames per second. Column 632, row 608 indicates the average video bit rate is 3400. Column 634, row 608 entry indicates the peak video bit rate is 4500 kbps. Column 636, row 608 entry indicates that the target device is XBOX/Desktop. Each of the other rows of table 600 excluding row 601 similarly contain information pertaining to the same segment encoded in a different ABR format as discussed above.

The information contained in table 660 of FIG. 6 will now be described. Column 640 is merely a table header which described the parameters included in each column of the table. Column 644 identifies the audio codec used to encode the segment. Column 646 identifies that an audio-codec is required for each of the ABR1 streams. Column 648 identifies the audio bit-rate which is the number of bits per second at which the audio content is encoded. The audio bit-rate is provided in kbps (kilobits per second). Column 650 identifies the sampling rate at which the audio portion of the segment was sampled. Column 652 identifies the bit depth of the audio portion of the segment which is the number of bits per audio sample. Column 654 indicates the number of audio channels, e.g., 1 channel for mono and two channels for stereo. Column 656 identifies the target device.

Row 642 identifies parameters associated with the audio portion of the encoded segments for the ABR1 through ABR10 streams of Table 600. The entry in column 644, row 642 indicates that the audio codec is a MPEG ACC Low complexity codec. The entry in column 646, row 642 indicates that the audio codec is required. The entry in column 648, row 642 indicates the audio bit rate is 128 kbps. The entry in column 650, row 642 indicates the sampling rate is 44100 or 48000 bits per second. The entry in column 652, row 642 indicates that the bit depth per sample is 16. The entry in column 654, row 642 indicates that 2 channels are used for audio. The entry in column 656, row 642 indicates the target device is XBOX/DESKTOP.

Figure 7:
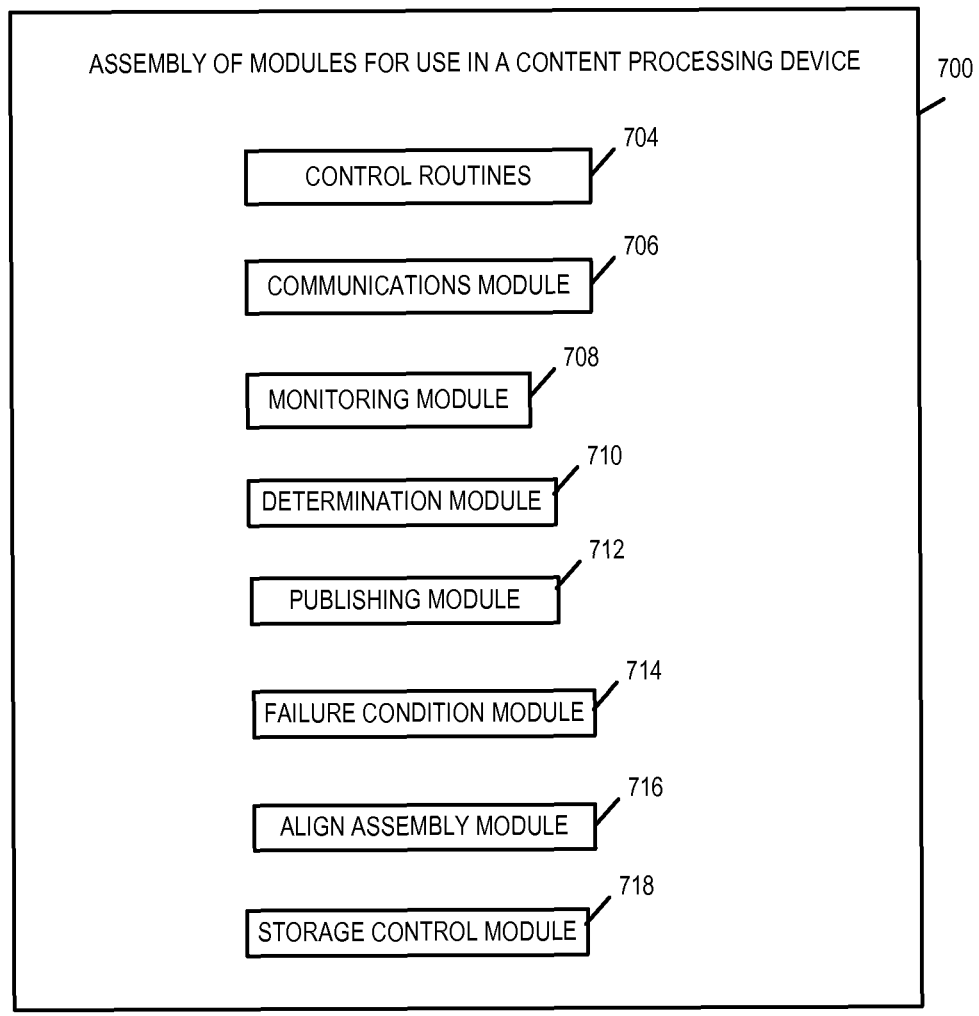
FIG. 7 illustrates an exemplary assembly of modules for use in a content delivery device in accordance with an embodiment of the present invention.

FIG. 7 illustrates an assembly of modules for use in a content processing device in accordance with an exemplary embodiment of the present invention. The assembly of modules 700 may be, and in some embodiments is, used as the assembly of modules 138 in content processing device 102 illustrated in FIG. 1. In some embodiments, the assembly of modules 700 is used as the assembly of assembly 106 in content processing device illustrated in FIG. 1. In some embodiments, some of the modules of the assembly of modules 700 are implemented as hardware as part of the assembly of modules 106 and some of the modules of the assembly of modules 700 are implemented in software as part of the assembly of modules 138. The assembly of modules 700 includes a control routines module 704, a communications module 706, a monitoring module 708, a determination module 710, a publishing module 712, a failure condition module 714, an align/assembly module 716, a storage control module 718.

Additional exemplary embodiments of a content processing device in accordance with the present invention will now be described in connection with the assembly of modules 700 of FIG. 7. A content processing device for encoding and distributing real time media content including an Input/Output (I/O) interface such as for example I/O Interface 144, a communications module 706, a plurality of encoders, a monitoring module 708, a determination module 710, and a publishing module 712. The I/O interface is configured to receive at least a first portion of a first content stream. The a plurality of encoders includes a first through Nth encoder, where N is an integer value greater than one. The communications module is configured to communicate the first portion of the content stream to the plurality of N encoders, said first portion being one of a plurality of portions in said first content stream. The first through Nth encoders are configured to operate in parallel to perform different encoding operations in real time to generate first through Nth encoded versions of said first portion of content, respectively, each of the first through Nth encoded versions of said first content portion being different with respect to at least one of an encoding standard, content format, resolution or data rate to which the encoded version corresponds. The monitoring module is configured to monitor the encoding status of each of the first through Nth encoders to determine completion of encoding of the first portion of the content stream by the first through Nth encoders or failure of one or more of the N encoders with regard to encoding said first portion of the first content stream. The determination module is configured to determine when at least the first through Nth encoders are done processing the first portion of the first content stream which includes determining on an individual per encoder basis whether the individual encoder has successfully completed encoding of the first portion of the first content stream or has encountered a failure with regard to encoding said first portion of the first content stream. The publishing module is configured to publish in response to determining that at least the first through Nth encoders are done processing the first portion of the content stream, at the same time, the successfully encoded versions of the first portion of the content stream. The content processing device receives, encodes, monitors status of encoding, determines completion of encoding or failure by individual encoders and publishes additional portions of the first content stream using the same techniques used to in connection with the first portion of the first content stream.

In some embodiments, one or more of the encoders of the content processing device are transcoders.

In some embodiments, the content processing device further includes a storage device for storing encoded versions of the first portion of the content stream generated by different ones of said first through Nth encoders. The storage device may be, and in some embodiments is a solid state storage device. In some embodiments, the storage device is memory such as Random Access Memory or flash memory. In some embodiments, the storage device is part of a storage area network.

In some embodiments, the content processing device further includes a failure condition indicator module 714 configured to set a failure condition indicator associated with said one of said first through Nth encoders in response to determining that one of said first through Nth encoders has encountered a failure with regard to encoding said first portion of the content stream and wherein said determination module 710 is also configured to treat said one of said first through Nth encoders to have encountered a failure as being in a failure condition with regard to encoding additional portions of the content stream until it is determined that said encoder is no longer subject to the detected encoding failure. In some embodiments, the determination module 710 of the content processing device is also configured to treat each encoder while in said failure condition as having encountered a failure with regard to encoding said additional portions of the first content stream.

In some embodiments, the content processing device's determination module is further configured to make a determination that said one of said first through Nth encoders is no longer in a failure condition upon receiving from said one of said first through Nth encoders an indication of successful coding of a subsequent content portion within a time period expected for successfully completing encoding of said subsequent content portion or a signal indicating recovery from said failure condition.

In some embodiments, the first content portion and subsequent content portions correspond to a predetermined time interval of video content. In some of such embodiments, the predetermined interval of video content is a 2 or 6 second interval.

In some embodiments, the first content stream is a content stream communicating video corresponding to a live event, said encoding and publishing occurring while said event is ongoing.

In some embodiments, the content processing device further includes first through Nth computing platforms, where N is an integer value greater than one, said first through N computing platforms each including one of said first through Nth encoders. In some of such embodiments, the first through N computing platforms are first through N processing blades or servers. In some embodiments, the first through Nth computing platforms are implemented in a bare metal environment. In some embodiments the computing platforms are ASICs. In some embodiments, the computing platforms are implemented using one or more processing circuits, processors, and/or other dedicated computing hardware and/or circuitry.

In some embodiments, one or more of the monitoring module, the determination module, and the publishing module are included in an align assembly module 716 which may be, and in some embodiments is a align assembly controller. In some embodiments, a processing controller such as for example processing controller 1, is used to perform operations ascribed to the monitoring module.

In another embodiment of the invention a user device dynamically that is in real time selects the encoded format of the first portion and subsequent portions of the first content stream by sending in real time requests to a content distribution server after publication of the plurality of encoded versions of the first and subsequent portions of the content stream. A request for a portion may be made once a portion has been published to the content distribution network, e.g., once the plurality of encoded versions of the first portion of the content stream are published the user device may select one of the encoded versions of the first portion of the content stream. In another embodiment, the user device determines the network bandwidth availability and selects the encoded format for one or more portions of the content stream based at least in part on the determined network bandwidth availability.

In another exemplary embodiment of the present invention, a content processing device for encoding and distributing real time media content includes an Input/Output (I/O) interface configured to receive at least a first portion of a first content stream and communicate the first portion of the content stream to the plurality of encoders, said first portion being one of a plurality of portions in said first content stream; a plurality of encoders including a first through Nth encoder, where N is an integer value greater than one; said first through Nth encoders being configured to operate in parallel to perform different encoding operations in real time to generate first through Nth encoded versions of said first portion of content, respectively, each of the first through Nth encoded versions of said first content portion being different with respect to at least one of an encoding standard, content format, resolution or data rate to which the encoded version corresponds; and a processor configured to: (i) monitor the encoding status of each of the first through Nth encoders to determine completion of encoding of the first portion of the content stream by the first through Nth encoders or failure of one or more of the N encoders with regard to encoding said first portion of the first content stream; (ii) determine when at least the first through Nth encoders are done processing the first portion of the first content stream, said determination including determining on an individual per encoder basis whether the individual encoder has successfully completed encoding of the first portion of the first content stream or has encountered a failure with regard to encoding said first portion of the first content stream; and (iii) publish in response to determining that at least the first through Nth encoders are done processing the first portion of the content stream, at the same time, the successfully encoded versions of the first portion of the content stream.

The techniques of various embodiments may be implemented using software, hardware and/or a combination of software and hardware. Various embodiments are directed to apparatus, e.g., communications device such as for example, a content processing device, a content server, etc. Various embodiments are also directed to methods, e.g., a method of operating a communications device such as a content processing device, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices described herein are implemented using one or more modules to perform the steps corresponding to one or more methods, for example, communicating the first portion of the content stream, monitoring the encoding status of each of the first through Nth encoders, making determinations and publishing the successfully encoded versions of portions of the first content stream, etc. Thus, in some embodiments various features are implemented using modules. Such modules may be implemented using software, hardware, e.g., circuits, or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a content processing device including a processor configured to implement one, multiple or all of the steps of one or more methods of the invention.

In some embodiments, the processor or processors, e.g., CPUs, of one or more devices, e.g., of the communications device, e.g., content processing device, are configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as communications device, e.g., content processing device, with a processor which includes a module corresponding to each of the steps of the various described methods performed by the device in which the processor is included. In some but not all embodiments an apparatus, e.g., a communications device, e.g., content processing device, processing blade, etc., includes a module corresponding to each of the steps of the various described methods performed by the device in which the processor is included. The modules may be implemented using software and/or hardware. The hardware may be circuits, ASICs or other specialized or dedicated circuitry. Module's functionality may also be implemented by one or more processors or hardware controllers.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device, e.g., a session border controller or a web server. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of encoding and distributing real time media content, the method comprising:
    receiving, at a content processing device at least a first portion of a first content stream;
    communicating the first portion of the first content stream to a plurality of encoders including a first through Nth encoder, where N is an integer value greater than one, said first portion being one of a plurality of portions in said first content stream;
    operating said first through Nth encoders in parallel to perform different encoding operations in real time to generate first through Nth encoded versions of said first portion of the first content stream, respectively, each of the first through Nth encoded versions of said first portion of the first content stream being different with respect to at least one of an encoding standard, content format, resolution or data rate to which the encoded version corresponds;
    monitoring the encoding status of each of the first through Nth encoders to determine completion of encoding of the first portion of the first content stream by the first through Nth encoders or failure of one or more of the N encoders with regard to encoding said first portion of the first content stream;
    determining, when at least one of the first through Nth encoders fails to complete encoding of the first portion of the first content stream in a predetermined time, that said one of the encoders has encountered a failure with regard to encoding the first portion of the first content stream;
    determining when at least the first through Nth encoders are done processing the first portion of the first content stream, said determining including determining on an individual per encoder basis whether the individual encoder has successfully completed encoding of the first portion of the first content stream or has encountered a failure with regard to encoding said first portion of the first content stream; and
    publishing, in response to determining that at least the first through Nth encoders are done processing the first portion of the first content stream, at the same time, the successfully encoded versions of the first portion of the first content stream, said publishing including communicating information identifying where successfully encoded versions of the first portion of the first content stream are stored; and
    wherein publishing, in response to determining that at least the first through Nth encoders are done processing the first portion of the content stream, at the same time, the successfully encoded versions of the first portion of the first content stream, is performed without publishing a version of the encoded first portion of the first content stream that is generated by the said one of the encoders that has encountered the failure thereby maintaining alignment of the published plurality of encoded versions of the first portion of the first content stream that were generated by encoders that successfully completed encoding of said first portion of the first content stream.

2. The method of claim 1, wherein one or more of the encoders are transcoders.

3. The method of claim 1, further comprising:
storing encoded versions of the first portion of the first content stream generated by different ones of said first through Nth encoders, as the encoders complete encoding different versions of said first portion of the first content stream, said storing preceding determining that the first through Nth encoders are done processing the first portion of the first content stream and preceding said publishing.

4. The method of claim 3, further comprising:
in response to determining that one of said first through Nth encoders has encountered a failure with regard to encoding said first portion of the first content stream, setting a failure condition indicator associated with said one of said first through Nth encoders; and
treating said one of said first through Nth encoders to have encountered a failure as being in a failure condition with regard to encoding additional portions of the first content stream until it is determined that said encoder is no longer subject to the detected encoding failure.

5. The method of claim 4, further comprising:
determining that said one of said first through Nth encoders is no longer in a failure condition by receiving from said one of said first through Nth encoders an indication of successful coding of a subsequent content portion within a time period expected for successfully completing encoding of said subsequent content portion or a signal indicating recovery from said failure condition.

6. The method of claim 5, wherein said first content portion and subsequent content portions correspond to a predetermined time interval of video content.

7. The method of claim 6, wherein said predetermined interval of video content is a 2 or 6 second interval.

8. The method of claim 1 wherein each of said first through N encoders is included in a first through N computing platform, where N is an integer value greater than one, said method further including: querying, each of said first through N computing platforms including an encoder which has been determined to have successfully completed encoding of the first portion of the first content stream, for a storage location address in which the encoded version of the first portion of the first content stream has been stored by the computing platform, said querying preceding said publishing.

9. The method of claim 8 wherein said first through N computing platforms are first through N processing blades.

10. The method of claim 8 wherein the computing platforms are implemented in a bare metal environment.

11. The method of claim 3, wherein communicating information identifying where successfully encoded versions of the first portion of the first content stream are stored includes:
publishing information, in the form of addresses, said addresses identifying where of the successfully processed versions of the first portion of the first content stream are stored.

12. A content processing device for encoding and distributing real time media content comprising:
an Input/Output (I/O) interface configured to receive at least a first portion of a first content stream and communicate the first portion of the first content stream to a plurality of encoders, said first portion being one of a plurality of portions in said first content stream;
a plurality of encoders including a first through Nth encoder, where N is an integer value greater than one, said first through Nth encoders being configured to operate in parallel to perform different encoding operations in real time to generate first through Nth encoded versions of said first portion of the first content stream, respectively, each of the first through Nth encoded versions of said first portion of the first content stream being different with respect to at least one of an encoding standard, content format, resolution or data rate to which the encoded version corresponds; and
a processor configured to:
monitor the encoding status of each of the first through Nth encoders to determine completion of encoding of the first portion of the first content stream by the first through Nth encoders or failure of one or more of the N encoders with regard to encoding said first portion of the first content stream;
determine, when at least one of the first through Nth encoders fails to complete encoding of the first portion of the first content stream in a predetermined time, that said one of the encoders has encountered a failure with regard to encoding the first portion of the first content stream;
determine when at least the first through Nth encoders are done processing the first portion of the first content stream, said determination including determining on an individual per encoder basis whether the individual encoder has successfully completed encoding of the first portion of the first content stream or has encountered a failure with regard to encoding said first portion of the first content stream; and
perform a publish operation, in response to determining that at least the first through Nth encoders are done processing the first portion of the first content stream, said publish operation including publishing at the same time the successfully encoded versions of the first portion of the content stream, said publish operation including communicating information identifying where successfully encoded versions of the first portion of the first content stream are stored; and
wherein said publish operation is performed without publishing a version of the encoded first portion of the first content stream that is generated by the said one of the encoders that has encountered the failure thereby maintaining alignment of the published plurality of encoded versions of the first portion of the first content stream that were generated by encoders that successfully completed encoding of said first portion of the first content stream.

13. The content processing device of claim 12, wherein one or more of the encoders are transcoders.

14. The content processing device of claim 13, further comprising:
a storage device for storing encoded versions of the first portion of the first content stream generated by different ones of said first through Nth encoders.

15. The content processing device of claim 14, further comprising:
a failure condition indicator module configured to set a failure condition indicator associated with said one of said first through Nth encoders in response to determining that one of said first through Nth encoders has encountered a failure with regard to encoding said first portion of the first content stream; and
wherein said processor is further configured to treat said one of said first through Nth encoders to have encountered a failure as being in a failure condition with regard to encoding additional portions of the first content stream until it is determined that said encoder is no longer subject to the detected encoding failure.

16. The content processing device of claim 15 wherein said processor is further configured to make a determination that said one of said first through Nth encoders is no longer in a failure condition upon receiving from said one of said first through Nth encoders an indication of successful coding of a subsequent content portion within a time period expected for successfully completing encoding of said subsequent content portion or a signal indicating recovery from said failure condition.

17. The content processing device of claim 16, wherein said first content portion and subsequent content portions correspond to a predetermined time interval of video content.

18. The content processing device of claim 17, wherein said first content stream is a content stream communicating video corresponding to a live event, said encoding and publishing occurring while said event is ongoing.

19. A non-transitory computer readable medium having machine executable instructions stored thereon for controlling a processor in a content processing device, the non-transitory computer readable medium including:
code for controlling the processor to receive at least a first portion of a first content stream;
code for controlling the processor to communicate the first portion of the first content stream to a plurality of encoders including a first through Nth encoder, where N is an integer value greater than one, said first portion of the first content stream being one of a plurality of portions in said first content stream;
code for controlling the processor to operate said first through Nth encoders in parallel to perform different encoding operations in real time to generate first through Nth encoded versions of said first portion of the first content stream, respectively, each of the first through Nth encoded versions of said first portion of the first content stream being different with respect to at least one of an encoding standard, content format, resolution or data rate to which the encoded version corresponds;
code for controlling the processor to monitor the encoding status of each of the first through Nth encoders to determine completion of encoding of the first portion of the first content stream by the first through Nth encoders or failure of one or more of the N encoders with regard to encoding said first portion of the first content stream;
code for controlling the processor to determine, when at least one of the first through Nth encoders fails to complete encoding of the first portion of the first content stream in a predetermined time, that said one of the encoders has encountered a failure with regard to encoding the first portion of the first content stream;
code for controlling the processor to determine when at least the first through Nth encoders are done processing the first portion of the first content stream, said determining including determining on an individual per encoder basis whether the individual encoder has successfully completed encoding of the first portion of the first content stream or has encountered a failure with regard to encoding said first portion of the first content stream; and
code for controlling the processor to perform a publish operation, in response to determining that at least the first through Nth encoders are done processing the first portion of the content stream, said publish operation including publishing at the same time the successfully encoded versions of the first portion of the first content stream, said publish operation including communicating information identifying where successfully encoded versions of the first portion of the first content stream are stored; and
wherein said publish operation is performed without publishing a version of the encoded first portion of the first content stream that is generated by the said one of the encoders that has encountered the failure thereby maintaining alignment of the published plurality of encoded versions of the first portion of the first content stream that were generated by encoders that successfully completed encoding of said first portion of the first content stream.

* * * * *